(12) United States Patent
Certain et al.

(10) Patent No.: US 11,374,873 B2
(45) Date of Patent: *Jun. 28, 2022

(54) MANAGING COMMITTED REQUEST RATES FOR SHARED RESOURCES

(71) Applicant: Amazon Technologies, Inc., Seattle, WA (US)

(72) Inventors: Tate Andrew Certain, Seattle, WA (US); Roland Paterson-Jones, Seattle, WA (US); James R. Hamilton, Seattle, WA (US); Sachin Jain, Issaquah, WA (US); Matthew S. Garman, Seattle, WA (US); David N. Sunderland, Seattle, WA (US); Danny Wei, Seattle, WA (US); Fiorenzo Cattaneo, Snoqualmie, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/104,295

(22) Filed: Nov. 25, 2020

(65) Prior Publication Data

US 2021/0083987 A1   Mar. 18, 2021

Related U.S. Application Data

(63) Continuation of application No. 16/166,929, filed on Oct. 22, 2018, now Pat. No. 10,855,614, which is a
(Continued)

(51) Int. Cl.
*G06F 15/173*   (2006.01)
*H04L 47/70*   (2022.01)
(Continued)

(52) U.S. Cl.
CPC .............. *H04L 47/70* (2013.01); *G06Q 10/00* (2013.01); *G06Q 30/0284* (2013.01);
(Continued)

(58) Field of Classification Search
CPC .... G06Q 10/00; G06Q 30/0284; G06Q 30/04; H04L 47/70; H04L 67/02; H04L 67/10
(Continued)

(56) References Cited

U.S. PATENT DOCUMENTS 6,249,836 B1   6/2001 Downs et al.
6,385,169 B1 * 5/2002 Wang ................. H04L 41/0896
                                                                370/230
(Continued)

FOREIGN PATENT DOCUMENTS

JP   2002024192   1/2002
JP   2004355638   12/2004
(Continued)

OTHER PUBLICATIONS

U.S. Non-Final Office Action dated Apr. 10, 2015 issued in U.S. Appl. No. 14/659,193.
(Continued)

*Primary Examiner* — Liang Che A Wang
(74) *Attorney, Agent, or Firm* — Robert C. Kowert; Kowert, Hood, Munyon, Rankin & Goetzel, P.C.

(57) ABSTRACT

Commitments against various resources can be dynamically adjusted for customers in a shared-resource environment. A customer can provision a data volume with a committed rate of Input/Output Operations Per Second (IOPS) and pay only for that commitment (plus any overage), for example, as well as the amount of storage requested. The customer can subsequently adjust the committed rate of IOPS by submitting an appropriate request, or the rate can be adjusted automatically based on any of a number of criteria. Data
(Continued)

volumes for the customer can be migrated, split, or combined in order to provide the adjusted rate. The interaction of the customer with the data volume does not need to change, independent of adjustments in rate or changes in the data volume, other than the rate at which requests are processed.

20 Claims, 8 Drawing Sheets

Related U.S. Application Data continuation of application No. 15/156,058, filed on May 16, 2016, now Pat. No. 10,110,503, which is a continuation of application No. 12/749,451, filed on Mar. 29, 2010, now Pat. No. 9,342,801.

(51) Int. Cl.

| | | |
|---|---|---|
| G06Q 30/02 | (2012.01) | |
| G06Q 30/04 | (2012.01) | |
| G06Q 10/00 | (2012.01) | |
| H04L 67/02 | (2022.01) | |
| H04L 67/10 | (2022.01) | |

(52) U.S. Cl.
CPC ............ G06Q 30/04 (2013.01); H04L 67/02 (2013.01); H04L 67/10 (2013.01)

(58) Field of Classification Search
USPC ......... 709/217, 218, 219, 223, 224, 225, 22, 709/226
See application file for complete search history.

(56) References Cited

U.S. PATENT DOCUMENTS

| | | | |
|---|---|---|---|
| 6,604,155 B1* | 8/2003 | Chong, Jr. ............ | G06F 3/0613 709/231 |
| 6,928,470 B1* | 8/2005 | Hamlin .................... | G06F 3/061 709/223 |
| 6,938,039 B1 | 8/2005 | Bober et al. | |
| 7,054,943 B1* | 5/2006 | Goldszmidt ............ | G06F 9/505 370/231 |
| 7,139,821 B1 | 11/2006 | Shah et al. | |
| 7,290,009 B1 | 10/2007 | Semret et al. | |
| 7,383,381 B1 | 6/2008 | Faulkner et al. | |
| 7,523,063 B2 | 4/2009 | Harrington et al. | |
| 7,555,456 B2 | 6/2009 | Rosenthal et al. | |
| 7,574,496 B2 | 8/2009 | McCrory et al. | |
| 7,743,001 B1 | 6/2010 | Vermeulen et al. | |
| 7,792,944 B2 | 9/2010 | DeSantis et al. | |
| 8,244,559 B2 | 8/2012 | Horvitz et al. | |
| 8,249,904 B1 | 8/2012 | DeSantis et al. | |
| 8,271,336 B2 | 9/2012 | Mikurak | |
| 8,280,790 B2 | 10/2012 | Lappas et al. | |
| 8,429,346 B1* | 4/2013 | Chen .................... | G06F 3/0649 711/114 |
| 8,464,255 B2 | 6/2013 | Nathuji et al. | |
| 8,533,103 B1 | 9/2013 | Certain et al. | |
| 8,694,400 B1 | 4/2014 | Certain et al. | |
| 8,739,170 B1 | 5/2014 | Gupta et al. | |
| 8,924,982 B2 | 12/2014 | Brandwine et al. | |
| 8,984,243 B1 | 3/2015 | Chen et al. | |
| 10,855,614 B2 | 12/2020 | Certain et al. | |
| 2002/0065833 A1 | 5/2002 | Litvin | |
| 2002/0083116 A1 | 6/2002 | Petrini et al. | |
| 2003/0018642 A1 | 1/2003 | Bakalash et al. | |
| 2003/0028642 A1 | 2/2003 | Agarwal et al. | |
| 2004/0064351 A1 | 4/2004 | Mikurak | |
| 2004/0092268 A1* | 5/2004 | Xu ........................ | H04W 48/10 455/450 |
| 2004/0107281 A1* | 6/2004 | Bose ...................... | H04L 29/06 709/226 |
| 2004/0133622 A1* | 7/2004 | Clubb .................... | G06Q 40/02 709/200 |
| 2004/0243692 A1 | 12/2004 | Arnold et al. | |
| 2004/0257985 A1* | 12/2004 | Sahai ...................... | H04L 47/29 370/229 |
| 2005/0076154 A1* | 4/2005 | Chambliss ............ | H04L 69/329 710/1 |
| 2005/0276219 A1* | 12/2005 | Wang .................... | H04L 47/326 370/229 |
| 2006/0153090 A1 | 7/2006 | Bishop et al. | |
| 2006/0190605 A1 | 8/2006 | Franz et al. | |
| 2006/0195508 A1 | 8/2006 | Bernardin et al. | |
| 2006/0209841 A1 | 9/2006 | Amorello et al. | |
| 2006/0215558 A1* | 9/2006 | Chow .................... | H04L 47/20 370/232 |
| 2007/0121505 A1* | 5/2007 | Ansari ................ | H04L 47/2408 370/230 |
| 2007/0183317 A1* | 8/2007 | Vasseur ............... | H04L 12/4633 370/225 |
| 2007/0240160 A1 | 10/2007 | Paterson-Jones et al. | |
| 2008/0080396 A1 | 4/2008 | Meijer et al. | |
| 2008/0082546 A1 | 4/2008 | Meijer et al. | |
| 2008/0082667 A1 | 4/2008 | Meijer et al. | |
| 2008/0109343 A1 | 5/2008 | Robinson et al. | |
| 2008/0301386 A1* | 12/2008 | Matsui ................ | G06F 11/2064 711/162 |
| 2009/0049443 A1 | 2/2009 | Powers et al. | |
| 2009/0172191 A1 | 7/2009 | Dumitriu et al. | |
| 2009/0193147 A1 | 7/2009 | Lepeska | |
| 2009/0198949 A1 | 8/2009 | Kuligowski et al. | |
| 2009/0320088 A1 | 12/2009 | Gill et al. | |
| 2009/0327493 A1 | 12/2009 | Gauthier et al. | |
| 2010/0004930 A1 | 1/2010 | Strope et al. | |
| 2010/0036850 A1 | 2/2010 | Garman et al. | |
| 2010/0076856 A1 | 3/2010 | Mullins | |
| 2010/0088205 A1 | 4/2010 | Robertson | |
| 2010/0217866 A1* | 8/2010 | Nandagopal ........ | H04L 67/1014 709/226 |
| 2010/0250700 A1 | 9/2010 | O'Brien et al. | |
| 2010/0257328 A1 | 10/2010 | Liu | |
| 2010/0281151 A1 | 11/2010 | Ramankutty et al. | |
| 2010/0332262 A1 | 12/2010 | Horvitz et al. | |
| 2011/0078705 A1 | 3/2011 | Maclinovsky et al. | |
| 2011/0131335 A1 | 6/2011 | Spaltro et al. | |
| 2011/0173637 A1 | 7/2011 | Brandwine et al. | |
| 2011/0213712 A1 | 9/2011 | Hadar et al. | |
| 2011/0225299 A1 | 9/2011 | Nathuji et al. | |
| 2011/0238546 A1 | 9/2011 | Certain et al. | |
| 2011/0238857 A1 | 9/2011 | Certain et al. | |
| 2011/0296023 A1 | 12/2011 | Ferris et al. | |
| 2011/0307898 A1 | 12/2011 | Fischer et al. | |
| 2012/0116893 A1 | 5/2012 | Murray, Jr. | |
| 2013/0293553 A1 | 11/2013 | Burr et al. | |
| 2014/0180862 A1 | 6/2014 | Certain et al. | |
| 2015/0186064 A1 | 7/2015 | Chen et al. | |

FOREIGN PATENT DOCUMENTS

| | | |
|---|---|---|
| JP | 2005234637 | 9/2005 |
| JP | 2006236351 | 9/2006 |
| JP | 2008293283 | 12/2008 |
| JP | 2009110347 | 5/2009 |

OTHER PUBLICATIONS

U.S. Notice of Allowance dated Nov. 21, 2014 issued in U.S. Appl. No. 13/775,00.
U.S. Notice of Allowance dated Sep. 4, 2014 issued in U.S. Appl. No. 12/686,273.
U.S. Non-Final Office Action dated May 8, 2014 issued in U.S. Appl. No. 12/686,273.
U.S. Final Office Action dated Jun. 19, 2013 issued in U.S. Appl. No. 12/686,273.
U.S. Non-Final Office Action dated Dec. 4, 2012 issued in U.S. Appl. No. 12/686,273.
U.S. Notice of Allowance dated May 10, 2013 issued in U.S. Appl. No. 12/882,097.

(56) References Cited

OTHER PUBLICATIONS

U.S. Final Office Action dated Feb. 1, 2013 issued in U.S. Appl. No. 12/882,097.
U.S. Non-Final Office Action dated Jul. 19, 2012 issued in U.S. Appl. No. 12/882,097.
U.S. Notice of Allowance dated Nov. 25, 2013 issued in U.S. Appl. No. 12/882,082.
U.S. Non-Final Office Action dated Jun. 3, 2013 issued in U.S. Appl. No. 12/882,082.
U.S. Non-Final Office Action dated Nov. 8, 2012 issued in U.S. Appl. No. 12/882,082.
U.S. Notice of Allowance dated Mar. 1, 2016 issued in U.S. Appl. No. 13/620,251.
U.S. Final Office Action dated Jun. 10, 2015 issued in U.S. Appl. No. 13/620,251.
U.S. Non-Final Office Action dated Nov. 21, 2014 issued in U.S. Appl. No. 13/620,251.
U.S. Final Office Action dated Jul. 27, 2015 issued in U.S. Appl. No. 14/191,194.
U.S. Non-Final Office Action dated Jan. 2, 2015 issued in U.S. Appl. No. 14/191,194.
International Search Report and Written Opinion dated May 25, 2011 issued in application serial No. PCT/US2011/030389.
Aaron Bertrand, Boris Baryshnikov; Using the Resource Governor; 70 pages, Jun. 2009.
M. Frank, The Ocean Project; The Open Computation Exchange and Auctioning Network; (Apr. 2002);http://www.cise.ufl.edu/research/ocean/.
Ben_Uehuda et al. Deconstructing Amazon EC2 Spot Instance Pricing, Computer Science Department Israel Institute of Technology, 2010; http://www.mulix.org/pubs/cloud/spotprice-cloudcom.pdf.
Altmann, J., "A model for resource sharing for Internet data center providers within the grid," Grid Economics and Business Models, 2004, GECON 2004, 1.sup.st IEEE International Workshop on, vol., No., pp. 113, 120, Apr. 23, 2004.
Bruno, E., "A Model That's Right for the Times," Information Week, May 25, 2009, pp. 1-5.
Buyya, R. et al., "Market-Oriented Cloud Computing: Vision, Hype, and Reality for Delivering IT Services as Computing Utilities," High Performance Computing and Communications, 2008. HPCC '08, 10.sup.th IEEE International Conference on, vol., No., pp. 5, 13, 25-27, Sep. 2008.
Conry-Murray, A., "What's in the Public Cloud," Information Week, Sep. 7, 2009, pp. 1-4.
Hodgkinson, S., "Spot price cloud pushes the envelope on commoditization of IT," Enterprise Networks & Servers (online), Jan. 25, 2010, pp. 1-3.
Jelling, Jacob. "Your PC Can Co12/882ntribute with Google Compute." Web Pro News, Sep. 29, 2004 [retrieved on Jan. 18, 2013]. Retrieved from the Internet: <URL: http://www.webpronews.com/your-pc-can-contribute-with-google-compute-2004- -09>.
McDonald, Paul. "Announcing Open Signups, Expected Pricing and Two New APIs." Google, May 28, 2008. [retrieved on Jan. 18, 2013]. Retrieved from the Internet: <URL: http://googleappengine.blogspot.com/2008/05/announcing-opensignups-expect- ed.html>.
Sun to Be Part of First Online Compute Exchange. [online]. HCP in the Cloud, Feb. 14, 2005 [retrieved on Jan. 1, 2013]. Retrieved from the Internet: <URL: http://www.hpcinthecloud.com/hpccloud/2005-02-14/sun_to_be_part_of_first_-online_compute_exchange.html>.
What is Google App Engine?. Datasheet [online]. Google, 2013 [retrieved on Jan. 18, 2013]. Retrieved from the Internet: <URL: https://developers.google.com/appengine/docs/whatisgoogleappengine>.
Weinhardt, C. et al., "Business Models in the Service World," IT Pro, Mar./Apr. 2009, pp. 1-7.
English abstract for JP2008293283, published on Dec. 4, 2008 and retrieved on Mar. 11, 2014.
English abstract for JP2006236351, published on Sep. 7, 2006 and retrieved on Mar. 11, 2014.
English abstract for JP2004355638, published on Dec. 16, 2004 and retrieved on Mar. 11, 2014.
English abstract for JP2002024192, published on Jan. 25, 2002 and retrieved on Mar. 11, 2014.
English translation of The Notice of Rejection dated Jan. 7, 2014, in corresponding Japanese Patent Application No. 2013-502763.
European Search Opinion and Supplemental Search Report dated Mar. 14, 2014, European Application No. 11763335.4, 5 pages.
Invitation to Respond to Written Opinion dated Mar. 20, 2013, Singaporean Application No. 201206966.
Notice of Final Rejection dated Oct. 7, 2014, Japanese Application No. 2013-502763.
USPTO Final Office Action dated Mar. 14, 2013, U.S. Appl. No. 12/749,451.
USPTO Final Office Action dated Jul. 8, 2013, for U.S. Appl. No. 12/749,449.
USPTO Final Office Action dated Feb. 20, 2015, for U.S. Appl. No. 12/749,449.
USPTO Final Office Action dated Jun. 8, 2016, for U.S. Appl. No. 12/749,449.
USPTO Final Office Action dated Nov. 16, 2017, for U.S. Appl. No. 12/749,449.
USPTO Non-Final Office Action dated Nov. 8, 2012, U.S. Appl. No. 12/749,449.
USPTO Non-Final Office Action dated Jun. 24, 2014, U.S. Appl. No. 12/749,449.
USPTO Non-Final Office Action dated Aug. 21, 2012, U.S. Appl. No. 12/749,451.
USPTO Non Final Office Action dated Feb. 15, 2013, received in U.S. Appl. No. 12/882,075.
USPTO Notice of Allowance dated Jan. 26, 2016 received in U.S. Appl. No. 12/749,451.
USPTO Notice of Allowance dated Sep. 3, 2013, for U.S. Appl. No. 12/882,075.
Neumann et al., "Exchanges for Grid and Cloud Computing," http://www.gridecon.eu/downloads/Sorma.pdf, E Strategies, British Publishers, Nov. 2008, pp. 25-26.
USPTO Non-Final Office Action dated Oct. 8, 2015, U.S. Appl. No. 12/749,449.
USPTO Non-Final Office Action dated Apr. 11, 2017, U.S. Appl. No. 12/749,449.
English abstract for JP2005234637, published on Sep. 2, 2005 and retrieved on Mar. 27, 2018.
English abstract for JP2009110347, published on May 21, 2009 and retrieved on Mar. 27, 2018.
Examination report issued in related Canadian Application No. 2,792,532, dated Dec. 22, 2017.
Final rejection issued in related U.S. Appl. No. 14/191,194, dated Oct. 30, 2017.
Non-Final rejection issued in related U.S. Appl. No. 14/191,194, dated Apr. 3, 2017.
Final rejection issued in U.S. Appl. No. 14/659,193, dated Dec. 29, 2016.
Non-Final rejection issued in U.S. Appl. No. 14/659,193, dated Dec. 6, 2017.
Non-Final rejection issued in U.S. Appl. No. 15/184,256, dated Dec. 15, 2017.
Non-Final rejection issued in U.S. Appl. No. 14/584,808, dated Jan. 12, 2017.
Final rejection issued in U.S. Appl. No. 14/584,808, dated Jun. 28, 2017.
Amazon web services introduces "reserved instances"—a new amazon EC2 pricing option that lets businesses realize lower compute costs than ever before. (Mar. 12, 2009). Business Wire Retrieved from https://dialog.proquest.com/professional/docview/679556198?accountid=1422- 57.

\* cited by examiner

MANAGING COMMITTED REQUEST RATES FOR SHARED RESOURCES

CROSS REFERENCE TO RELATED APPLICATION

The application is a continuation of U.S. patent application Ser. No. 16/166,929, filed Oct. 22, 2018, which is a continuation of U.S. patent application Ser. No. 15/156,058, filed May 16, 2016, now U.S. Pat. No. 10,110,503, which is a continuation of U.S. patent application Ser. No. 12/749,451, filed Mar. 29, 2010, now U.S. Pat. No. 9,342,801, which are hereby incorporated by reference herein their entirety.

BACKGROUND

As an increasing number of applications and services are being made available over networks such as the Internet, an increasing number of content, application, and/or service providers are turning to technologies such as remote resource sharing cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources.

In some environments, multiple users can share resources such as data repositories, wherein the users can concurrently send multiple read and/or write requests to be executed against the same data instance, for example. Problems can arise, however, when the number of concurrent requests exceeds the ability of the instance to process those requests. In one example, a data server for an instance might get into an overload situation and begin putting back pressure on the incoming requests in order to reduce the rate of incoming requests and allow the system to recover from the overload situation. As a result of the push back, however, customers might not receive a desired or necessary rate of request handling (e.g., satisfying or otherwise processing received requests), which can upset the customers and in some cases cause the customers to look to other providers for data storage and similar resources. Certain conventional approaches attempt to throttle requests when a particular customer exceeds some usage threshold, for example, but these approaches tend to be reactive and can still lead to the other customers of a resource experiencing slow downs and overload situations. Further, conventional approaches do not provide customers with the ability to easily adjust the rates or allocation of various resources.

BRIEF DESCRIPTION OF THE DRAWINGS

Various embodiments in accordance with the present disclosure will be described with reference to the drawings, in which.

DETAILED DESCRIPTION

Figure 1:
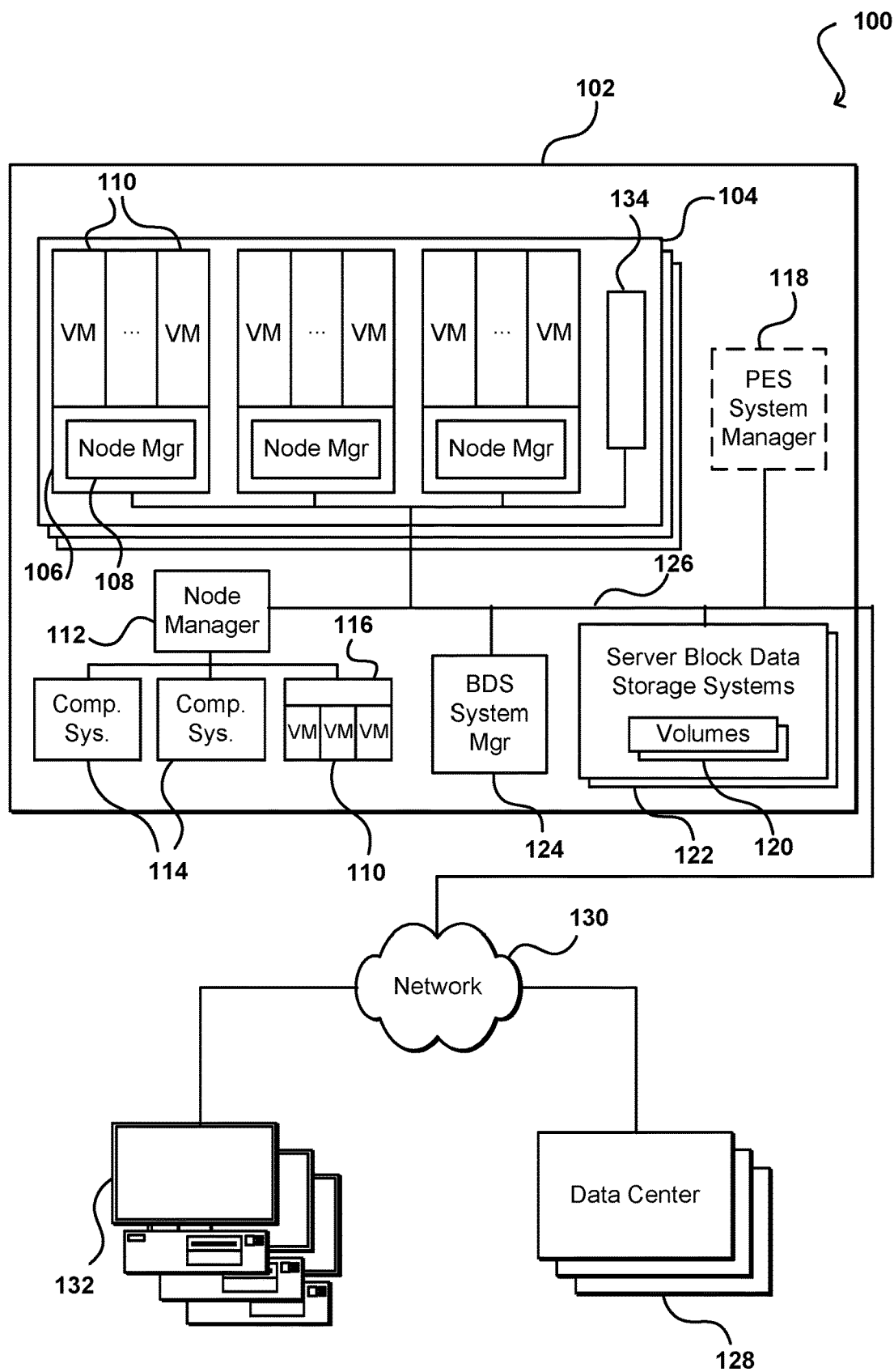
FIG. 1 illustrates an environment in which various embodiments can be implemented.

Systems and methods in accordance with various embodiments of the present disclosure may overcome one or more of the aforementioned and other deficiencies experienced in conventional approaches to managing aspects of resource sharing and allocation in an electronic environment. For example, various embodiments enable users to request a specific quality of service or level of processing, such as a minimum and/or committed rate of input/output operations per second (IOPS) against a particular resource. The requested amount can be any appropriate amount, which can be less than the total amount provided by the respective resource, providing a finer granularity than is possible with conventional approaches. Multiple customers can be assigned to a single resource, such as a data server, with each of the customers potentially receiving a guaranteed level of service. In various embodiments, customers requesting rate commitments that cannot be provided by a single available resource can have the commitment spread across multiple resources or resource instances. Each resource can have an acceptable level of guarantees (e.g., rate commitments), which can be a percentage or portion of the total amount available on the resource, the full amount available, or in some cases greater than the total amount. Since customers often will not use the entire committed amount (e.g., the guaranteed rate of IOPS), certain resources can have resource commitments above 100% of the available capacity. Further, other customers can be provisioned on those resources as well. If less than the full available capacity of a resource is committed to guarantee service levels, the remaining customers can share the un-committed capacity. When one of the customers with a guarantee is using less than the guaranteed amount, the other customers can utilize this unused capacity, until such time as the guaranteed customer requests to use that capacity. Such an approach improves the quality of service for non-committed customers, while decreasing the cost of providing guaranteed service levels.

Customers in certain embodiments can provision resources in a fine-grained manner that matches the customer's specific performance requirements. If, for example, a customer has a database that requires 300 IOPS, the customer can provision a data volume with a committed rate of 300 IOPS and pay only for that commitment, plus the amount of storage requested. The customer will be able to complete at least 300 IOPS, averaged over some period, for the data volume. If the customer submits 500 IOPS on average, the volume may still complete 500 per second over time if the system is not under pressure; however, the system will deliver at least the committed 300 over time even when under pressure.

In a conventional system, a customer wanting a certain IOPS rate typically has to obtain the appropriate number of physical disks and pay for the amount of storage on those disks. For typical workloads, the customer then has to overbuy considerably on storage to get the desired IOPS rate. Using approaches of the various embodiments, customer can obtain a guaranteed quality of service for a shared storage solution, at a level of granularity not possible with conventional systems. The finer granularity can also represent significant cost savings for a customer, as opposed to buying or renting dedicated hardware.

Systems and methods in accordance with various embodiments can also automatically (utilizing algorithms and/or appropriate logic executed by at least one computing device) migrate data volumes, adjust resource commitments, and handle other such tasks pertaining to request rate commitments or other quality of service levels. In some embodiments, a customer might request a change in commitment level, or the system or service might determine that a change in commitment level is to be executed. In accordance with various embodiments, the capacity of various resources can be determined and the commitment for a customer can be adjusted automatically, without the customer having to adjust or change any parameters, applications, etc., in order to effect the change. Data volumes can be migrated, split, combined, or otherwise manipulated in accordance with various embodiments, depending at least in part upon the committed rate or change in rate. Changes can be managed from a control plane, for example, with appropriate calls being made into the data plane.

Systems and methods in accordance with various embodiments are operable to management access to resources such as data storage. In at least some embodiments, these approaches include providing a block data storage service that uses multiple server storage systems to reliably store block data that may be accessed and used over one or more networks by any of various users, applications, processes, and/or services. Users of the block data storage service may each create one or more block data storage volumes that each have a specified amount of block data storage space, and may initiate use of such a block data storage volume (also referred to as a "volume" herein) by one or more executing programs, with at least some such volumes having copies stored by two or more of the multiple server storage systems so as to enhance volume reliability and availability to the executing programs. As one example, the multiple server block data storage systems that store block data may in some embodiments be organized into one or more pools or other groups that each have multiple physical server storage systems co-located at a geographical location, such as in each of one or more geographically distributed data centers, and the program(s) that use a volume stored on a server block data storage system in a data center may execute on one or more other physical computing systems at that data center.

In addition, in at least some embodiments, applications that access and use one or more such non-local block data storage volumes over one or more networks may each have an associated node manager that manages the access to those non-local volumes by the program, such as a node manager module that is provided by the block data storage service and/or that operates in conjunction with one or more Block Data Service (BDS) System Manager modules. For example, a first user who is a customer of the block data storage service may create a first block data storage volume, and execute one or more program copies on one or more computing nodes that are instructed to access and use the first volume (e.g., in a serial manner, in a simultaneous or other overlapping manner, etc.). When an application executing on a computing node initiates use of a non-local volume, the application may mount or otherwise be provided with a logical block data storage device that is local to the computing node and that represents the non-local volume, such as to allow the executing program to interact with the local logical block data storage device in the same manner as any other local hard drive or other physical block data storage device that is attached to the computing node (e.g., to perform read and write data access requests, to implement a file system or database or other higher-level data structure on the volume, etc.). For example, in at least some embodiments, a representative logical local block data storage device may be made available to an executing program via use of an appropriate technology, such as GNBD ("Global Network Block Device") technology. In addition, when an application interacts with the representative local logical block data storage device, the associated node manager may manage those interactions by communicating over one or more networks with at least one of the server block data storage systems that stores a copy of the associated non-local volume (e.g., in a manner transparent to the executing program and/or computing node) so as to perform the interactions on that stored volume copy on behalf of the executing program. Furthermore, in at least some embodiments, at least some of the described techniques for managing access of applications and services to non-local block data storage volumes are automatically performed by embodiments of a Node Manager module.

In at least some embodiments, block data storage volumes (or portions of those volumes) may further be stored on one or more remote archival storage systems that are distinct from the server block data storage systems used to store volume copies. In various embodiments, the one or more remote archival storage systems may be provided by the block data storage service (e.g., at a location remote from a data center or other geographical location that has a pool of co-located server block data storage systems), or instead may be provided by a remote long-term storage service and used by the block data storage, and in at least some embodiments the archival storage system may store data in a format other than block data (e.g., may store one or more chunks or portions of a volume as distinct objects).

In some embodiments, at least some of the described techniques are performed on behalf of a program execution service that manages execution of multiple programs on behalf of multiple users of the program execution service. In some embodiments, the program execution service may have groups of multiple co-located physical host computing systems, and may execute users' programs on those physical host computing systems, such as under control of a program execution service ("PES") system manager, as discussed in greater detail below. In such embodiments, users of the program execution service (e.g., customers of the program execution service who pay fees to use the program execution service) who are also users of the block data storage service may execute programs that access and use non-local block data storage volumes provided via the block data storage service. In other embodiments, a single organization may provide at least some of both program execution service capabilities and block data storage service capabilities (e.g., in an integrated manner, such as part of a single service), while in yet other embodiments the block data storage service may be provided in environments that do not include a program execution service (e.g., internally to a business or other organization to support operations of the organization).

In addition, the host computing systems on which programs execute may have various forms in various embodiments. Multiple such host computing systems may, for example, be co-located in a physical location (e.g., a data center), and may be managed by multiple node manager modules that are each associated with a subset of one or more of the host computing systems. At least some of the host computing systems may each include sufficient computing resources (e.g., volatile memory, CPU cycles or other CPU usage measure, network bandwidth, swap space, etc.) to execute multiple programs simultaneously, and, in at least some embodiments, some or all of the computing systems may each have one or more physically attached local block data storage devices (e.g., hard disks, tape drives, etc.) that can be used to store local copies of programs to be executed and/or data used by such programs. Furthermore, at least some of the host computing systems in some such embodiments may each host multiple virtual machine computing nodes that each may execute one or more programs on behalf of a distinct user, with each such host computing system having an executing hypervisor or other virtual machine monitor that manages the virtual machines for that host computing system. For host computing systems that execute multiple virtual machines, the associated node manager module for the host computing system may in some embodiments execute on at least one of multiple hosted virtual machines (e.g., as part of or in conjunction with the virtual machine monitor for the host computing system), while in other situations a node manager may execute on a physical computing system distinct from one or more other host computing systems being managed.

The server block data storage systems on which volumes are stored may also have various forms in various embodiments. In at least some embodiments, some or all of the server block data storage systems may be physical computing systems similar to the host computing systems that execute programs, and in some such embodiments may each execute server storage system software to assist in the provision and maintenance of volumes on those server storage systems. For example, in at least some embodiments, one or more of such server block data storage computing systems may execute at least part of the BDS System Manager, such as if one or more BDS System Manager modules are provided in a distributed peer-to-peer manner by multiple interacting server block data storage computing systems. In other embodiments, at least some of the server block data storage systems may be network storage devices that may lack some I/O components and/or other components of physical computing systems, such as if at least some of the provision and maintenance of volumes on those server storage systems is performed by other remote physical computing systems (e.g., by a BDS System Manager module executing on one or more other computing systems). In addition, in some embodiments, at least some server block data storage systems each maintains multiple local hard disks, and stripes at least some volumes across a portion of each of some or all of the local hard disks. Furthermore, various types of techniques for creating and using volumes may be used, including in some embodiments to use LVM ("Logical Volume Manager") technology.

In at least some embodiments, some or all block data storage volumes each have copies stored on two or more distinct server block data storage systems, such as to enhance reliability and availability of the volumes. By doing so, failure of a single server block data storage system may not cause access of executing programs to a volume to be lost, as use of that volume by those executing programs may be switched to another available server block data storage system that has a copy of that volume. In such embodiments, consistency may be maintained between the multiple copies of a volume on the multiple server block data storage systems in various ways. For example, in some embodiments, one of the server block data storage systems is designated as storing the primary copy of the volume, and the other one or more server block data storage systems are designated as storing mirror copies of the volume in such embodiments, the server block data storage system that has the primary volume copy (referred to as the "primary server block data storage system" for the volume) may receive and handle data access requests for the volume, and in some such embodiments may further take action to maintain the consistency of the other mirror volume copies (e.g., by sending update messages to the other server block data storage systems that provide the mirror volume copies when data in the primary volume copy is modified, such as in a master-slave computing relationship manner). Various types of volume consistency techniques may be used, with additional details included below.

In addition to maintaining reliable and available access of executing programs to block data storage volumes by moving or otherwise replicating volume copies when server block data storage systems become unavailable, the block data storage service may perform other actions in other situations to maintain access of executing programs to block data storage volumes. For example, if a first executing program unexpectedly becomes unavailable, in some embodiments the block data storage service and/or program execution service may take actions to have a different second executing program (e.g., a second copy of the same program that is executing on a different host computing system) attach to some or all block data storage volumes that were in use by the unavailable first program, so that the second program can quickly take over at least some operations of the unavailable first program. The second program may in some situations be a new program whose execution is initiated by the unavailability of the existing first program, while in other situations the second program may already be executing (e.g., if multiple program copies are concurrently executed to share an overall load of work, such as multiple Web server programs that receive different incoming client requests as mediated by a load balancer, with one of the multiple program copies being selected to be the second program; if the second program is a standby copy of the program that is executing to allow a "hot" swap from the existing first program in the event of unavailability, such as without the standby program copy being actively used until the unavailability of the existing first program occurs; etc.). In addition, in some embodiments, a second program to which an existing volume's attachment and ongoing use is switched may be on another host physical computing system in the same geographical location (e.g., the same data center) as the first program, while in other embodiments the second program may be at a different geographical location (e.g., a different data center, such as in conjunction with a copy of the volume that was previously or concurrently moved to that other data center and will be used by that second program). Furthermore, in some embodiments, other related actions may be taken to further facilitate the switch to the second program, such as by redirecting some communications intended for the unavailable first program to the second program.

As previously noted, in at least some embodiments, some or all block data storage volumes each have copies stored on two or more distinct server block data storage systems at a single geographical location, such as within the same data center in which executing programs will access the volume by locating all of the volume copies and executing programs at the same data center or other geographical location, various desired data access characteristics may be maintained (e.g., based on one or more internal networks at that data center or other geographical location), such as latency and throughput. For example, in at least some embodiments, the described techniques may provide access to non-local block data storage that has access characteristics that are similar to or better than access characteristics of local physical block data storage devices, but with much greater reliability that is similar to or exceeds reliability characteristics of RAID ("Redundant Array of Independent (or Inexpensive) Disks") systems and/or dedicated SANs ("Storage Area Networks") and at much lower cost. In other embodiments, the primary and mirror copies for at least some volumes may instead be stored in other manners, such as at different geographical locations (e.g., different data centers), such as to further maintain availability of a volume even if an entire data center becomes unavailable. In embodiments in which volume copies may be stored at different geographical locations, a user may in some situations request that a particular program be executed proximate to a particular volume (e.g., at the same data center at which the primary volume copy is located), or that a particular volume be located proximate to a particular executing program, such as to provide relatively high network bandwidth and low latency for communications between the executing program and primary volume copy.

Furthermore, access to some or all of the described techniques may in some embodiments be provided in a fee-based or other paid manner to at least some users. For example, users may pay one-time fees, periodic (e.g., monthly) fees and/or one or more types of usage-based fees to use the block data storage service to store and access volumes, to use the program execution service to execute programs, and/or to use archival storage systems (e.g., provided by a remote long-term storage service) to store long-term backups or other snapshot copies of volumes. Fees may be based on one or more factors and activities, such as indicated in the following non-exclusive list: based on the size of a volume, such as to create the volume (e.g., as a one-time fee), to have ongoing storage and/or use of the volume (e.g., a monthly fee), etc.; based on non-size characteristics of a volume, such as a number of mirror copies, characteristics of server block data storage systems (e.g., data access rates, storage sizes, etc.) on which the primary and/or mirror volume copies are stored, and/or a manner in which the volume is created (e.g., a new volume that is empty, a new volume that is a copy of an existing volume, a new volume that is a copy of a snapshot volume copy, etc.); based on the size of a snapshot volume copy, such as to create the snapshot volume copy (e.g., as a one-time fee) and/or have ongoing storage of the volume (e.g., a monthly fee); based on the non-size characteristics of one or more snapshot volume copies, such as a number of snapshots of a single volume, whether a snapshot copy is incremental with respect to one or more prior snapshot copies, etc.; based on usage of a volume, such as the amount of data transferred to and/or from a volume (e.g., to reflect an amount of network bandwidth used), a number of data access requests sent to a volume, a number of executing programs that attach to and use a volume (whether sequentially or concurrently), etc.; based on the amount of data transferred to and/or from a snapshot, such as in a manner similar to that for volumes; etc. In addition, the provided access may have various forms in various embodiments, such as a onetime purchase fee, an ongoing rental fee, and/or based on another ongoing subscription basis. Furthermore, in at least some embodiments and situations, a first group of one or more users may provide data to other users on a fee-based basis, such as to charge the other users for receiving access to current volumes and/or historical snapshot volume copies created by one or more users of the first group (e.g., by allowing them to make new volumes that are copies of volumes and/or of snapshot volume copies; by allowing them to use one or more created volumes; etc.), whether as a one-time purchase fee, an ongoing rental fee, or on another ongoing subscription basis.

In some embodiments, one or more application programming interfaces (APIs) may be provided by the block data storage service, program execution service and/or remote long-term storage service, such as to allow other programs to programmatically initiate various types of operations to be performed (e.g., as directed by users of the other programs). Such operations may allow some or all of the previously described types of functionality to be invoked, and include, but are not limited to, the following types of operations: to create, delete, attach, detach, or describe volumes; to create, delete, copy or describe snapshots; to specify access rights or other metadata for volumes and/or snapshots; to manage execution of programs; to provide payment to obtain other types of functionality; to obtain reports and other information about use of capabilities of one or more of the services and/or about fees paid or owed for such use; etc. The operations provided by the API may be invoked by, for example, executing programs on host computing systems of the program execution service and/or by computing systems of customers or other users that are external to the one or more geographical locations used by the block data storage service and/or program execution service.

FIG. 1 illustrates an example network configuration 100 in which multiple computing systems are operable to execute various programs, applications, and/or services, and further operable to access reliable non-local block data storage, such as under the control of a block data storage service and/or program execution service, in accordance with various embodiments. In particular, in this example, a program execution service manages the execution of programs on various host computing systems located within a data center 102, and a block data storage service uses multiple other server block data storage systems at the data center to provide reliable non-local block data storage to those executing programs. Multiple remote archival storage systems external to the data center may also be used to store additional copies of at least some portions of at least some block data storage volumes.

In this example, a data center 102 includes a number of racks 104, each rack including a number of host computing devices 106, as well as an optional rack support computing system 134 in this example embodiment. The host computing systems 106 on the illustrated rack 104 each host one or more virtual machines 110 in this example, as well as a distinct Node Manager module 108 associated with the virtual machines on that host computing system to manage those virtual machines. One or more other host computing systems 116 may also each host one or more virtual machines 110 in this example. Each virtual machine 110 may act as an independent computing node for executing one or more program copies (not shown) for a user (not shown), such as a customer of the program execution service. In addition, this example data center 102 further includes additional host computing systems 114 that do not include distinct virtual machines, but may nonetheless each act as a computing node for one or more programs (not shown) being executed for a user. In this example, a Node Manager module 112 executing on a computing system (not shown) distinct from the host computing systems 114 and 116 is associated with those host computing systems to manage the computing nodes provided by those host computing systems, such as in a manner similar to the Node Manager modules 108 for the host computing systems 106. The rack support computing system 134 may provide various utility services for other computing systems local to its rack 102 (e.g., long-term program storage, metering, and other monitoring of program execution and/or of non-local block data storage access performed by other computing systems local to the rack, etc.), as well as possibly to other computing systems located in the data center. Each computing system may also have one or more local attached storage devices (not shown), such as to store local copies of programs and/or data created by or otherwise used by the executing programs, as well as various other components.

In this example, an optional computing system 118 is also illustrated that executes a PES System Manager module for the program execution service to assist in managing the execution of programs on the computing nodes provided by the host computing systems located within the data center (or optionally on computing systems located in one or more other data centers 128, or other remote computing systems 132 external to the data center). As discussed in greater detail elsewhere, a PES System Manager module may provide a variety of services in addition to managing execution of programs, including the management of user accounts (e.g., creation, deletion, billing, etc.); the registration, storage, and distribution of programs to be executed; the collection and processing of performance and auditing data related to the execution of programs; the obtaining of payment from customers or other users for the execution of programs; etc. In some embodiments, the PES System Manager module may coordinate with the Node Manager modules 108 and 112 to manage program execution on computing nodes associated with the Node Manager modules, while in other embodiments the Node Manager modules may not assist in managing such execution of programs.

This example the data center 102 also includes a computing system 124 that executes a Block Data Storage ("BDS") system manager module for the block data storage service to assist in managing the availability of non-local block data storage to programs executing on computing nodes provided by the host computing systems located within the data center (or optionally on computing systems located in one or more other data centers 128, or other remote computing systems 132 external to the data center). In particular, in this example, the data center 102 includes a pool of multiple server block data storage systems 122, which each have local block storage for use in storing one or more volume copies 120. Access to the volume copies 120 is provided over the internal network(s) 126 to programs executing on various computing nodes 110 and 114. As discussed in greater detail elsewhere, a BDS System Manager module may provide a variety of services related to providing non-local block data storage functionality, including the management of user accounts (e.g., creation, deletion, billing, etc.); the creation, use and deletion of block data storage volumes and snapshot copies of those volumes; the collection and processing of performance and auditing data related to the use of block data storage volumes and snapshot copies of those volumes; the obtaining of payment from customers or other users for the use of block data storage volumes and snapshot copies of those volumes; etc. In some embodiments, the BDS System Manager module may coordinate with the Node Manager modules to manage use of volumes by programs executing on associated computing nodes, while in other embodiments the Node Manager modules may not be used to manage such volume use. In addition, in other embodiments, one or more BDS System Manager modules may be structured in other manners, such as to have multiple instances of the BDS System Manager executing in a single data center (e.g., to share the management of non-local block data storage by programs executing on the computing nodes provided by the host computing systems located within the data center), and/or such as to have at least some of the functionality of a BDS System Manager module being provided in a distributed manner by software executing on some or all of the server block data storage systems 122 (e.g., in a Peer to-peer manner, without any separate centralized BDS System Manager module on a computing system 124).

In this example, the various host computing systems, server block data storage systems, and computing systems are interconnected via one or more internal networks 126 of the data center, which may include various networking devices (e.g., routers, switches, gateways, etc.) that are not shown. In addition, the internal networks 126 are connected to an external network 130 (e.g., the Internet or other public network) in this example, and the data center 102 may further include one or more optional devices (not shown) at the interconnect between the data center and an external network (e.g., network proxies, load balancers, network address translation devices, etc.). In this example, the data center 102 is connected via the external network 130 to one or more other data centers 128 that each may include some or all of the computing systems and storage systems illustrated with respect to data center 102, as well as other remote computing systems 132 external to the data center. The other computing systems 132 may be operated by various parties for various purposes, such as by the operator of the data center or third parties (e.g., customers of the program execution service and/or of the block data storage service). In addition, one or more of the other computing systems may be archival storage systems (e.g., as part of a remote network-accessible storage service) with which the block data storage service may interact, such as under control of one or more archival manager modules (not shown) that execute on the one or more other computing systems or instead on one or more computing systems of the data center, as described in greater detail elsewhere. Furthermore, while not illustrated here, in at least some embodiments, at least some of the server block data storage systems 122 may further be interconnected with one or more other networks or other connection mediums, such as a high-bandwidth connection over which the server storage systems 122 may share volume data (e.g., for purposes of replicating copies of volumes and/or maintaining consistency between primary and mirror copies of volumes), with such a high-bandwidth connection not being available to the various host computing systems in at least some such embodiments.

It will be appreciated that the example of FIG. 1 has been simplified for the purposes of explanation, and that the number and organization of host computing systems, server block data storage systems and other devices may be much larger than what is depicted in FIG. 1. For example, as one illustrative embodiment, there may be approximately 4,000 computing systems per data center, with at least some of those computing systems being host computing systems that may each host fifteen virtual machines, and/or with some of those computing systems being server block data storage systems that may each store several volume copies. If each hosted virtual machine executes one program, then such a data center may execute as many as sixty thousand program copies at one time. Furthermore, hundreds or thousands (or more) volumes may be stored on the server block data storage systems, depending on the number of server storage systems, size of the volumes, and number of mirror copies per volume. It will be appreciated that in other embodiments, other numbers of computing systems, programs and volumes may be used.

Figure 2:
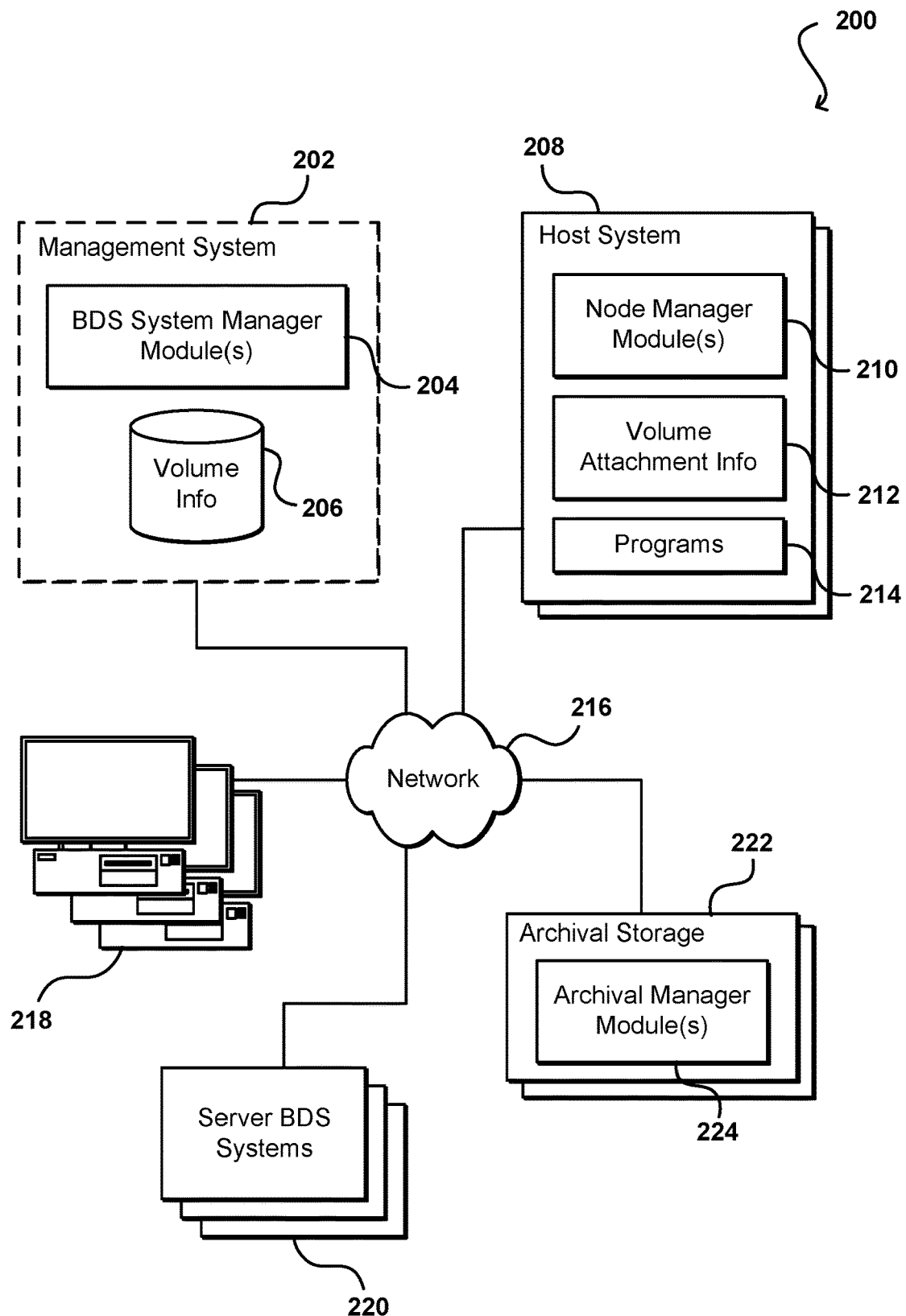
FIG. 2 illustrates an example separation of management and host components that can be used in accordance with various embodiments.

FIG. 2 illustrates an example environment 200 including computing systems suitable for managing the provision and use of reliable non-local block data storage functionality to clients that can be used in accordance with various embodiments. In this example, a management system 202, such as one or more server computers including one or more externally-facing customer interfaces, is programmed to execute an embodiment of at least one BDS System Manager module 204 to manage provisioning of non-local block data storage functionality to programs executing on host computing systems 208 and/or on at least some other computing systems 218, such as to block data storage volumes (not shown) provided by the server block data storage systems 220. Each of the host computing systems 208 in this example also executes an embodiment of a Node Manager module 210 to manage access of programs 214 executing on the host computing system to at least some of the non-local block data storage volumes, such as in a coordinated manner with the BDS System Manager module 204 over a network 216 (e.g., an internal network of a data center, not shown, that includes the computing systems 202, 208, 220, and optionally at least some of the other computing systems 218). In other embodiments, some or all of the Node Manager modules 210 may instead manage one or more other computing systems (e.g., the other computing systems 218).

In addition, multiple server block data storage systems 220 are illustrated that each can store at least some of the non-local block data storage volumes (not shown) used by the executing programs 214, with access to those volumes also provided over the network 216 in this example. One or more of the server block data storage systems 220 may also each store a server software component (not shown) that manages operation of one or more of the server block data storage systems, as well as various information (not shown) about the data that is stored by the server block data storage systems. Thus, in at least some embodiments, the server computing system 202 of FIG. 2 may correspond to the computing system 124 of FIG. 1, one or more of the Node Manager modules 108 and 112 of FIG. 1 may correspond to the Node Manager modules 210 of FIG. 2, and/or one or more of the server block data storage computing systems 220 of FIG. 2 may correspond to server block data storage systems 122 of FIG. 1. In addition, in this example embodiment, multiple archival storage systems 222 are illustrated, which may store snapshot copies and/or other copies of at least portions of at least some block data storage volumes stored on the server block data storage systems 220. The archival storage systems 222 may also interact with some or all of the computing systems 202, 208, and 220, and in some embodiments may be remote archival storage systems (e.g., of a remote storage service, not shown) that interact with the computing systems over one or more other external networks (not shown).

The other computing systems 218 may further include other proximate or remote computing systems of various types in at least some embodiments, including computing systems via which customers or other users of the block data storage service interact with the management and/or host systems. Furthermore, one or more of the other computing systems 218 may further execute a PES System Manager module to coordinate execution of programs on the host computing systems 208 and/or other host computing systems 218, or the management system 202 or one of the other illustrated computing systems may instead execute such a PES System Manager module, although a PES System Manager module is not illustrated in this example.

In the illustrated embodiment, a Node Manager module 210 is executing in memory in order to manage one or more other programs 214 executing in memory on the computing system, such as on behalf of customers of the program execution service and/or block data storage service. In some embodiments, some or all of the computing systems 208 may host multiple virtual machines, and if so, each of the executing programs 214 may be an entire virtual machine image (e.g., with an operating system and one or more application programs) executing on a distinct hosted virtual machine computing node. The Node Manager module 210 may similarly be executing on another hosted virtual machine, such as a privileged virtual machine monitor that manages the other hosted virtual machines. In other embodiments, the executing program copies 214 and the Node Manager module 210 may execute as distinct processes on a single operating system (not shown) executed on a single computing system 208.

The archival storage system 222 is operable to execute at least one Archival Manager module 224 in order to manage operation of one or more of the archival storage systems, such as on behalf of customers of the block data storage service and/or of a distinct storage service that provides the archival storage systems. In other embodiments, the Archival Manager module(s) 224 may instead be executing on another computing system, such as one of the other computing systems 218 or on the management system 202 in conjunction with the BDS System Manager module 204. In addition, while not illustrated here, in some embodiments various information about the data that is stored by the archival storage systems 222 may be maintained in storage for the archival storage systems or elsewhere.

The BDS System Manager module 204 and Node Manager modules 210 may take various actions to manage the provisioning and/or use of reliable non-local block data storage functionality to clients (e.g., executing programs), as described in greater detail elsewhere. In this example, the BDS System Manager module 204 may maintain a database 206 that includes information about volumes stored on the server block data storage systems 220 and/or on the archival storage systems 222 (e.g., for use in managing the volumes), and may further store various other information (not shown) about users or other aspects of the block data storage service. In other embodiments, information about volumes may be stored in other manners, such as in a distributed manner by Node Manager modules 210 on their computing systems and/or by other computing systems. In addition, in this example, each Node Manager module 210 on a host computing system 208 may store information 212 about the current volumes attached to the host computing system and used by the executing programs 214 on the host computing system, such as to coordinate interactions with the server block data storage systems 220 that provide the primary copies of the volumes, and to determine how to switch to a mirror copy of a volume if the primary volume copy becomes unavailable. While not illustrated here, each host computing system may further include a distinct logical local block data storage device interface for each volume attached to the host computing system and used by a program executing on the computing system, which may further appear to the executing programs as being indistinguishable from one or more other local physically attached storage devices that provide local storage.

An environment such as that illustrated with respect to FIGS. 1-2 can be used to provide and manage resources shared among various customers. In one embodiment, a virtualized storage system can be provided using a number of data servers, each having a number of storage devices (e.g., storage disks) attached thereto. The storage system can expose the storage to the customers as a Web service, for example. Customers then can submit Web services requests, or other appropriate requests or calls, to allocate storage on those servers and/or access that storage from the instances provisioned for those customers. In certain embodiments, a user is able to access the data volumes of these storage devices as if those storage devices are conventional block devices. Since the data volumes will appear to the customer instances as if each volume is a disk drive or similar block device, the volumes can be addressed with offsets, lengths, and other such conventional block device aspects. Further, such a system can provide what will be referred to herein as "read after write" consistency, wherein data is guaranteed to be able to be read from the data as soon as the data is written to one of these data volumes. Such a system can provide relatively low latency, such as latencies less than about ten milliseconds. Such a system thus in many ways functions as a traditional storage area network (SAN), but with improved performance and scalability.

Using a management system as illustrated in FIG. 2, for example, a customer can make a Web service call into an appropriate API of a Web service layer of the system to provision a data volume and attach that volume to a data instance for that customer. The management system can be thought of as residing in a control plane, or control environment, with the data volumes and block storage devices residing in a separate data plane, or data environment. In one example, a customer with at least one provisioned instance can call a "CreateVolume" or similar API, via Web services, which enables the customer to specify the amount allows them to specify the amount of storage to be allocated, such as a value between 1 GB and 1 TB, in 1 GB increments. Components of the control plane, such as a BDS system manager module, can call into the data plane to allocate the desired amount of storage from the available resources, and can provide the customer with an identifier for the data volume. In some embodiments, the customer then can call an "AttachVolume" or similar API, wherein the customer provides values for parameters such as an instance identifier, a volume identifier, and a device name, depending on factors such as the operating system of the instance, using a scheme that the operating system provides for hard drives and similar storage devices, as from inside the instance there is no apparent difference, from at least a functionality and naming point of view, from a physical hard drive. Once the customer has attached the data volume to a provisioned instance, the customer can perform various functionality, such as to build a file system, use as raw storage for a data system, or any other such activity that would normally be performed with a conventional storage device. When the customer no longer requires the data volume, or for any other appropriate reason, the customer can call a "DetatchVolume" or similar API, which can cause the association of the instance to that volume to be removed. In some embodiments, the customer can then attach a new instance or perform any of a number of other such activities. Since the data volume will fail independently of the instances in some embodiments, the customer can attach a volume to a new instance if a currently associated instance fails.

In certain approaches, a customer requesting a data volume is not able to select or request a particular type of volume, or a particular type of performance. A customer is typically granted an amount of storage, and the performance follows a "best effort" type of approach, wherein customer requests are performed based on the capability, load, and other such factors of the system at the time of the request. Each customer is typically charged the same amount per unit measure, such as the same dollar amount per gigabyte of storage per month, as well as the same amount per number of I/O requests per month, charged in an amount such as in increments of millions of requests per month.

As discussed above, however, such an approach can be problematic in situations such as where the number of requests waiting to be processed by an instance exceeds the ability of the instance to process those requests. Even if a customer is within the expected or allocated number of requests for that customer, other customers submitting requests to that instance can exceed their allocation, creating an overload situation where the data server for the instance can begin putting back pressure on the incoming requests in order to reduce the rate of incoming requests and allow the system to move out of the overload situation. Thus, each customer on the device with pending requests can experience a decrease in the rate of request handling (the "request rate"), as well as other issues such as a decrease in available storage.

Systems and methods in accordance with various embodiments enable customers to ensure a minimum level of performance by enabling each customer to specify one or more committed request rates or other performance guarantees. In addition to a minimum amount of storage, each customer can purchase a committed rate of operations, such as a specific number of input/output (I/O) operations per second (IOPS). In previous systems, performance guarantees were obtained by dedicating an entire machine to a customer, along with dedicated bandwidth, etc., which often is overkill. Embodiments discussed herein can allow customers to purchase performance guarantees at any appropriate level of granularity. By managing the performance allocations for customers on various resources, systems and methods in accordance with various embodiments can enable customers to purchase volumes that have an IOPS guarantee at any appropriate level, such as between 1 IOPS and 5,000 IOPS. By allocating portions of disks, spindles, and other such resources, a system can offer customers guaranteed levels of storage and/or IOPS.

Systems and methods in accordance with various embodiments allow users to share resources, providing specific guarantees or commitments with respect to those resources at a level of granularity that is not possible with conventional solutions. In many cases, customers may wish to specify a minimum processing rate, such as a minimum number of I/O operations per second (IOPS). Approaches in accordance with various embodiments can commit the desired amount of server and other resources necessary to provide at least a committed level of performance. By committing to a level of performance, a customer can receive a consistent quality of service level that is not affected by the performance of other customers sharing a device or resource. Even in an overload situation, the customer can receive at least the guaranteed level of service. The amount of guaranteed service can depend upon various factors, as well as the amount specified and paid for by the customer.

Figure 3:
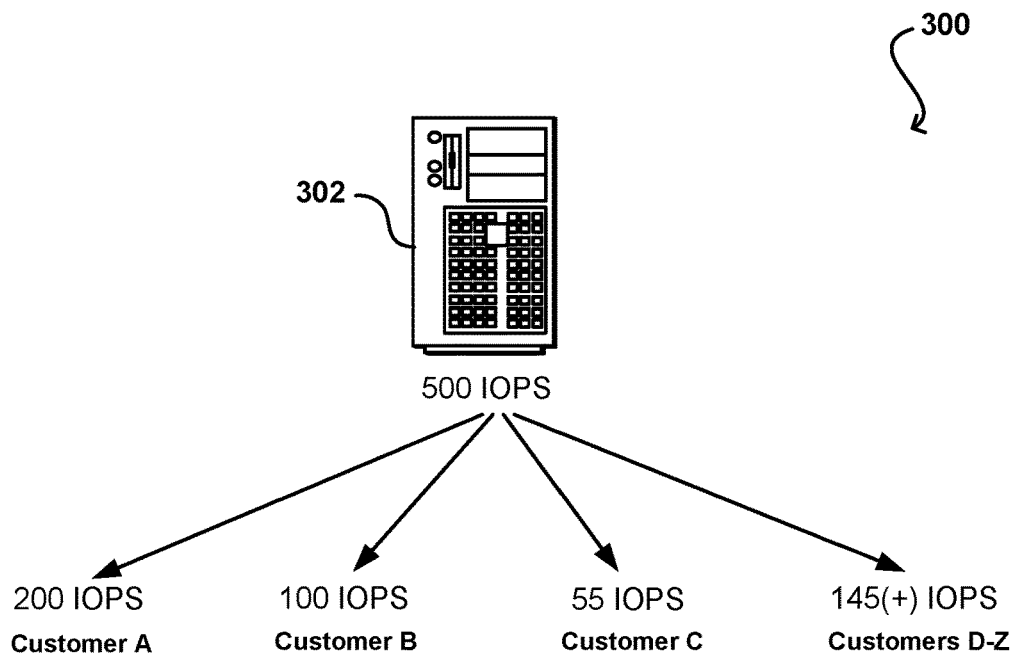
FIG. 3 illustrates an example allocation for multiple customers that can be used in accordance with various embodiments.

For example, FIG. 3 illustrates an example distribution 300 wherein the processing capacity of a server 302 is allocated among several customers. In this example, the server is determined to have a capacity for about 500 IOPS. This value can be an estimated or average value, and can be determined or adjusted over time based on monitored performance or other such information. While all 500 IOPS can be allocated in some embodiments, it can be desirable in other embodiments to only allocate a threshold amount, percentage, or other portion of the total capacity as guarantees. Since the processing time for each request can vary, the number of IOPS at any given time can vary as well, such that allocating all 500 IOPS might cause short periods of time where the customers are unable to receive their guarantees when the actual performance is on the order of 450 IOPS due to the nature of the requests being processed, etc.

In this example, the system might be able to allocate up to 400 of the 500 IOPS available for the server 302. As can be seen, Customer A has been allocated a committed 200 IOPS, Customer B has been allocated a committed 100 IOPS, and Customer C has been allocated a committed 55 IOPS. The remaining customers on the server then can utilize a "best performance" or similar approach sharing the remaining 145 IOPS (on average). The number of customers sharing the remaining IOPS can be selected or limited based upon a number of factors, such that the remaining customers can still obtain a desirable level of performance a large percentage of the time.

In many cases, however, Customers A, B, and C will not all utilize their entire committed capacity. Each of those customers might pay to guarantee a level of performance such that the level is available when needed, but often will not actually be running near that peak capacity. In this situation, the remaining Customers D-Z can actually share more than the remaining 145 IOPS, as those customers can utilize available capacity from the committed IOPS that are not being currently used. This provides another advantage, as customers can receive guaranteed levels of performance, but when those levels are not being fully utilized the remaining capacity can be used to service other customer requests. Such an approach enables the regular customers (without guarantees) to receive improved performance, without the need for the provider to purchase excess capacity or provide capacity that is not being utilized a vast majority of the time.

In some embodiments, any of Customers A-C can exceed their performance guarantees. For example, Customer A might, for a period of time, submit requests on the order of 250 IOPS. For the 50 IOPS above the committed rate, those requests in some embodiments can be treated as normal requests and processed at the same performance level as those of customers D-Z. In an overload situation, any throttling, slow down, or other reduction in processing can then be applied to the 145 or so IOPS that are not subject to guarantees. The guaranteed levels for Customers A, B, and C will not be affected, as the overflow adjustments are made to the non-committed portion. Accordingly, customers with non-guaranteed levels of service can be charged lower prices per request, period, etc.

In other embodiments, when any of Customers A-C exceed its performance guarantees, that customer can receive a "blended" or other level of service. In a situation where each request for a customer is treated individually or without context, such that any single request over a committed rate can be treated as a request without a committed rate, there can be a negative impact on the other requests for that customer. For example, if Customer A has a committed rate of 250 IOPS and at one point issues 251 requests in a second, that single request over the rate commitment can be processed much more slowly than the other requests, such as at 20 ms instead of 1 ms. If the customer application is expecting a performance level of about 1 ms and experiences a slowdown with respect to one request, that can have an impact on the processing of the other requests as well, and can cause a significant slowdown or other problems for the application even though the customer only slightly exceeded the threshold for a short period of time.

Systems and methods in accordance with various embodiments address such a situation by providing a "boost" or blended rate to customers with rate guarantees who exceed those guarantees, which provides a level of service between a committed and uncommitted rate. For example, a customer with a rate guarantee might have any excess requests placed at or near the front of the "queue" for uncommitted requests. In other embodiments, the customer might receive a lower rate commitment for those requests, such as might experience a delay of about 5 ms, which are not processed at the same rate as requests within the committed rate, but are processed more quickly than for customers without a committed rate. The amount of delay can be related in some embodiments to the amount of overage and the length of time that the customer is over the guaranteed rate, to provide a relatively uniform degradation in performance that is at least somewhat proportional to the amount of overage. For example, a customer with a guaranteed rate of 100 IOPS who is consistently sending requests at a rate of 500 per second would likely not receive as much of a boost as a customer with a 250 IOPS guaranteed rate who occasionally goes over by a handful of requests. In some embodiments, a customer can be provided with the same rate for any overage, but can be charged a premium for each such request. Many other variations are possible as well within the scope of the various embodiments.

To manage the commitments, components of a control plane can essentially make reservations against specific servers or other resources in the data plane. In FIG. 3 where three customers want a total of 355 IOPS committed, the control plane can reserve that level against a single server, for example, and allocate the remainder to any other customer provisioned on that server. The control plane can also ensure that more volumes are not allocated to a server than the server can handle, due to space limitations, the number of I/Os that need to be generated, or any other such factor.

Figure 4:
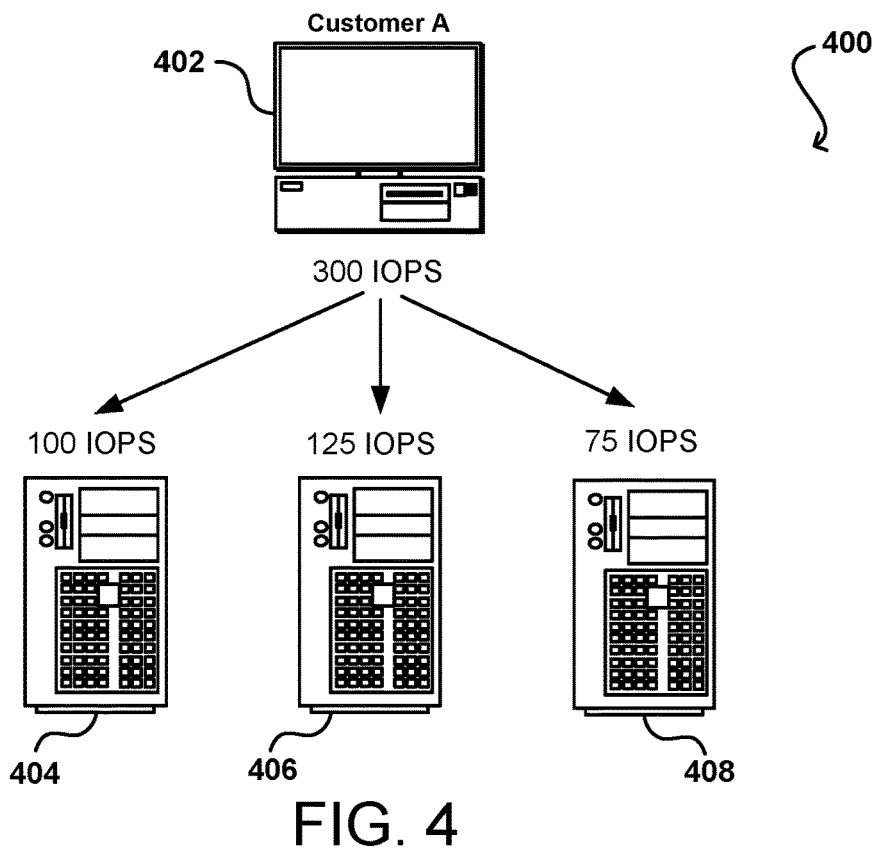
FIG. 4 illustrates an example allocation across multiple resource instances that can be used in accordance with various embodiments.

In some cases, a customer might want a guaranteed level of service that exceeds the "committable" capacity for a given resource. For example, in FIG. 3 it was stated that the server could allocate 400 IOPS, but 355 are already allocated to Customers A-C. If another customer wants 300 IOPS, that number would exceed the allowed amount (as well as the average capacity) of the server. Thus, the customer cannot receive the desired commitment on that server. Using the management components of the control plane, however, the commitment rate can be allocated across multiple servers. For example, in the allocation 400 of FIG. 4, it is shown that Customer A sends a request from a user device 402 requesting a guarantee of 300 IOPS. The control plane in some embodiments can search the available servers to determine if a server is available with 300 IOPS left for guarantees. If not, the control plane can attempt to spread the IOPS across as few servers as possible. In this case, the control plane determines to allocate the IOPS guarantee across three servers, with a first server 404 providing a guarantee of 100 IOPS, a second server 406 providing a guarantee of 125 IOPS, and a third server 408 providing a guarantee of 75 IOPS. Thus, a volume does not need to be resident on a single server as in many conventional systems, but can be partitioned across multiple servers. The allocation across multiple servers also enables customers to utilize larger data volumes, such as volumes of 50 terabytes instead of 1 terabyte, as the data can be spread across multiple servers. In such an embodiment, a customer can purchase between 1 GB and 50 TB of storage, for example, with a desired commitment rate, such as a rate between 0 IOPS and 5,000 IOPS. Based on one or more of these values selected by a customer, the control plane can determine an appropriate, if not optimal, way to provide those guarantees using available resources in the data plane.

In some embodiments, the committed rate might be allocated up to 100% of the capacity of a server. An amount of un-committed usage can be predicted and/or monitored, such that a number of customers can be allocated to resources that are fully committed, as long as the customer is willing to take resources only as they come available. Certain customers might not care when IOPS occur, particularly for certain writes, such that they would be willing to pay a lower rate to utilize resources that are guaranteed up to 100%, knowing that some customers likely will not utilize their full guaranteed levels. Such an approach assists the provider in maximizing the utilization of each resource by allocating un-commited IOPS on resources that are otherwise "fully" committed.

Further, different types of customers will have different requirements. For example, if a disk has 100 TB of space and 100 IOPS capacity, a first customer might want to store 90 TB of vacation photos that are rarely accessed. That customer might be interested in purchasing 90 TB of storage space along with an uncommitted level of IOPS. Another user might want a 1 TB database that is going to be under constant use, such that the user might want about 100 IOPS. In this example, the first customer could be sold 90% of the for storage, and the other customer can be allocated 90% (or more) of the IOPS of the disk as a commitment. Due to the nature of the customers, they both could be provisioned on the same disk, where otherwise each might have required a dedicated disk.

Enabling others to utilize the unused portion of a customer's committed allocation can benefit that customer as well, because the customer may not have to pay for the entire allocation and thus can receive a lower cost that would be required for a dedicated resource. Further, the customer will still receive the guaranteed level of service. When the customer is at the full committed level, other customers on that device will have to reduce their rate of request or wait longer per request. In some embodiments, a resource can be fully committed and other users can still be provisioned on the device to utilize the unused portions of the resource. In some cases, where predictions and monitoring accurately support such use, a resource can even be committed for over 100%, where the actual use by the allocated customers will almost never equal or surpass 100% usage. In such an embodiment, there can be other resources that can pick up any overage in the event of an unlikely event where the resource is overloaded.

In order to make commitments on a new resource (or new instance of a resource), certain default information can be used to make commitments. It can be desirable to use relatively conservative numbers as the defaults, in order to prevent over-committing a resource. For example, a control plane component can use general default information that each spindle of a particular type can handle 100-120 IOPS. If there are twelve spindles per server, there can be about 1200-1440 IOPS available per server. The control plane components can be conservative, initially, and can allocate a first amount, such as up to 400 IOPS, until more information is gained about the performance and usage of that resource. In certain examples customer utilization is about 10%, such that in many instances customers are using only 10% of the available IOPS. Thus, dedicating 40% to guaranteed IOPS would still be four times more than is actually being used, and thus likely is still a conservative number. Each server in the data plane can track the amount of available space on the server, and can store the number of IOPS that are committed for that server. Thus, when a new volume is to be created, the control plane components can determine a server that, out of that 400 IOPS, has enough capacity available that the server is willing to commit for that volume. An approach in one embodiment is to ask servers, at random or in a particular order, whether they can take a specific number of IOPS, and this continues until a server is located that can accept the IOPS. When the information is also stored in the control plane, however, the control plane can select an appropriate server first and then contact that server to take the volume.

In some cases, a customer having a committed IOPS rate, or other resource commitment, might want or need to adjust that rate. For example, a customer application might support additional users or additional functionality might be pushed out onto the cloud. In another example, a customer might want to reduce the number of committed IOPS when the customer is no longer in need of the currently committed capacity. In yet other examples, a customer might want higher committed rates during periods of peak use, but lower committed rates at all other times. Various other situations can arise as well, where a customer may desire a change in the committed rate.

As discussed, many conventional systems would require a user wanting a greater committed rate to purchase or otherwise obtain additional hardware, which often is not cost effective for the user and can take a significant amount of time to obtain, install, and/or activate. Similarly, users wanting a lower commitment would often be stuck with the hardware already purchased, or left to attempt to resell the hardware to attempt to recoup some of the expenditure.

Systems and methods in accordance with various embodiments enable rate commitments to be adjusted dynamically, in response to customer requests, established thresholds, usage variations, or any of a number of other such criteria or inputs. The system can automatically adjust resources as needed, such as to provision or allocate additional resources, add or move data volumes, split customers across multiple resources, or any of a number of other such actions as described and suggested herein. The system in various embodiments includes at least one monitoring component operable to monitor usage of resources in a data environment and adjust the utilization of the resources based on established criteria. The control plane also can include one or more interfaces (e.g., Web service APIs) enabling customers to request specific changes, or establish criteria to be used in making such changes. Various other approaches can be used as well within the scope of the various embodiments.

Figure 5:
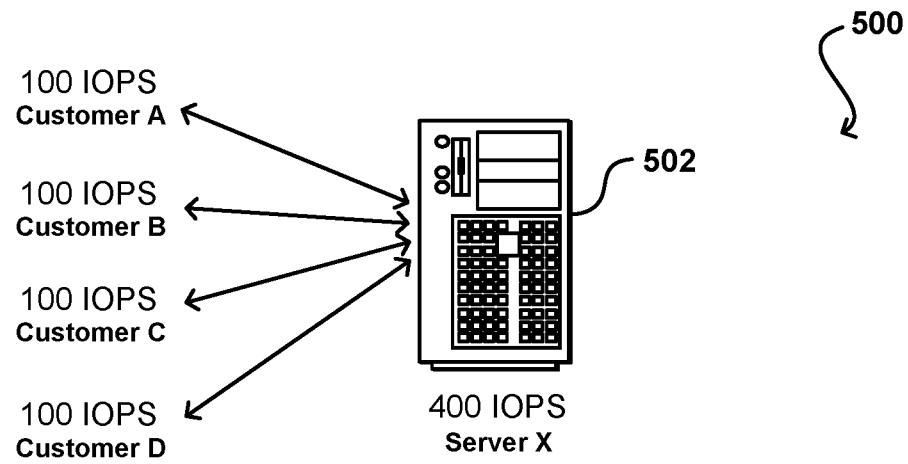
FIG. 5 illustrates an example allocation for multiple customers on a single resource instance that can be used in accordance with various embodiments.

FIG. 5 illustrates an example situation 500 wherein each of four different customers has a rate guaranteed against a common server 502. In this example, the server has a (committable) rate capacity of 400 IOPS, and each customer has a committed rate of 100 IOPS. As discussed above, many customers do not utilize their entire committed allocation such that the entire capacity of the server can be committed in various embodiments, as any overage by one or more of those customers can likely be processed using the unused capacity committed to one or more of the other users.

In certain instances, however, it can be desirable to adjust the way in which the rate commitment is provided for at least one of the customers utilizing that server. If one of the customers needs a higher rate commitment in this for example, there would not be sufficient committable capacity on the server to accommodate the higher rate. In such a situation, the data volume for which the additional rate commitment is needed can be automatically migrated to another server without any knowledge or actions required on the part of the customer.

Figure 6:
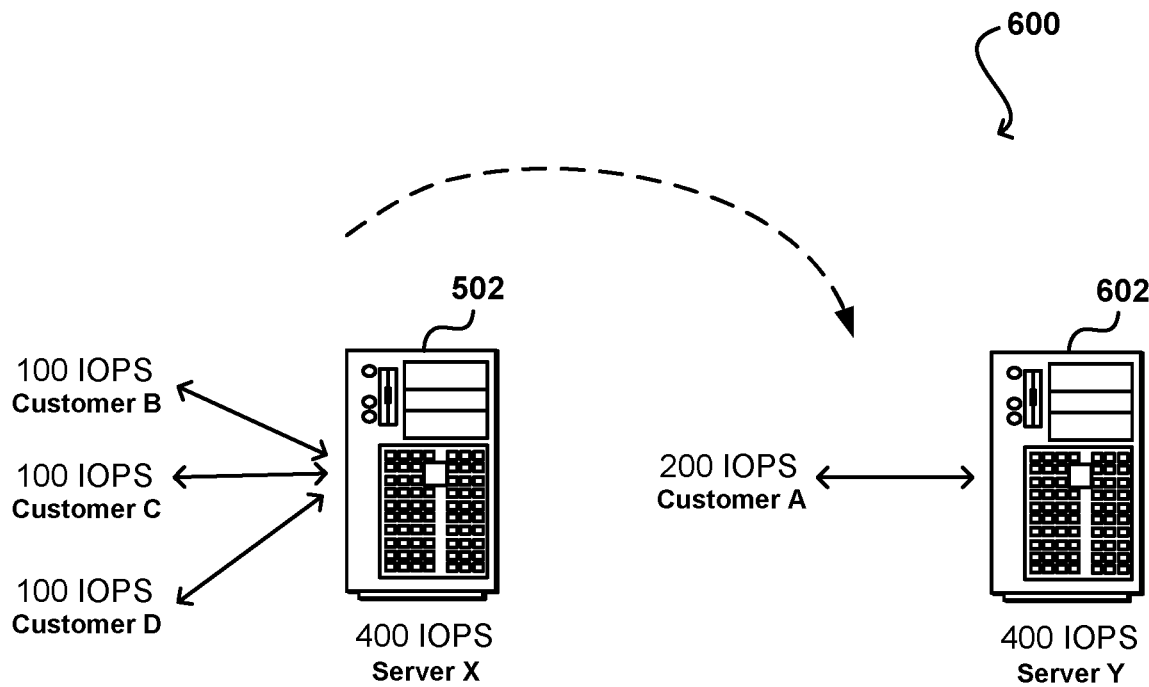
FIG. 6 illustrates an example allocation for an increased customer commitment using multiple resource instances that can be used in accordance with various embodiments.

In a first example 600, as illustrated in FIG. 6, Customer A from FIG. 5 is to receive an IOPS rate commitment increase from 100 IOPS to 200 IOPS. As can be seen, the full committable capacity of the current server instance 502 is already allocated, such that the server cannot provide the additional commitment for Customer A. In this embodiment, the system (or service) locates a resource instance 602 with the necessary available capacity to provide the entire rate commitment for Customer A. Thus, a process or workflow of a management system (or another such component or process) can migrate the data volume and cause the customer I/O requests to be directed to, and handled by, the second server instance 602 without any change necessary to the corresponding client application, etc. The management process can cause any appropriate actions to be performed, such as to provision a new data instance and/or move customer data, update address mapping in the data plane, etc., such that the customer can receive the higher commitment rate without any actions or changes needed to be taken on the part of the customer.

Figure 7:
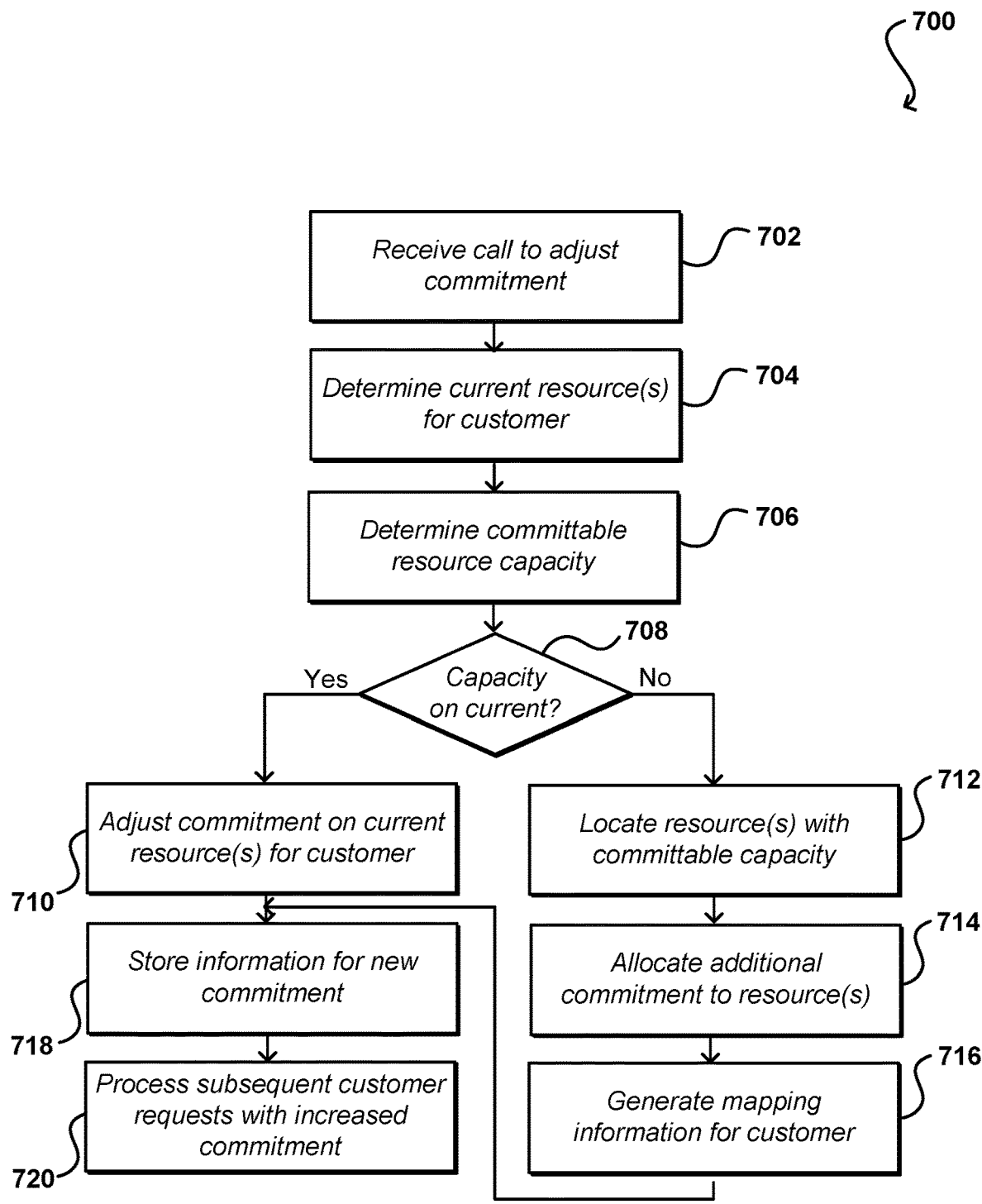
FIG. 7 illustrates an example process for obtaining a guaranteed level of service in accordance with one embodiment.

Using components such as those discussed above, FIG. 7 illustrates an example process 700 by which a guaranteed level of service, or committed rate of processing, for a resource can be updated for a given customer in accordance with various embodiments. As should be understood, the illustrated steps are examples, and that additional, fewer, or alternative steps can be performed in similar or alternative orders, or in parallel, within the scope of the various embodiments. Further, the process can be performed for any appropriate components or elements, such as at least one data instance, repository, or other such data source in a data environment, here a data plane, using a control plane or a similar data control application or service. While the term "customer" is used herein to refer to the "owner" of specific data, or a data store or instance hosted by the system, it should be understood that the term customer is used merely for convenience, and that any appropriate user or developer can be allowed to access the control plane and data plane in the various embodiments.

In an embodiment where the rate change is triggered by a user request, a Web services call or similar request is received through one of a plurality of APIs or other such customer-facing interface components 702. The request can be analyzed to determine any actions needed to process the request, where necessary. As discussed, this can take the form of a component of a Web services layer parsing the request to determine the action(s) being requested. In an embodiment where the API receiving the request corresponds to a specific action to be performed, the Web services layer can extract information from the request to be used in determining aspects or parameters of the action to be performed.

Once one or more requested (or necessary) actions are determined, the system can determine the resource(s) (e.g., servers) that the customer is currently using 704, as well as the additional committable capacity of the resource(s) 706. As discussed, in some embodiments this includes searching against a table in a data store accessible to the management system, or other such repository, to determine whether a resource has the desired capacity. In other embodiments, this can involve contacting the servers individually. Even though capacity can be provided by multiple resource instances, it can be desirable from at least a management standpoint to attempt to provide the additional rate commitment using a resource that the customer is already using, instead of spreading the customer requests across another resource. If the current resources(s) being used by that customer have the additional committable capacity to satisfy the request 708, the process can cause the resource(s) to allocate the additional commitment 710, whereby the additional rate can be available immediately to the customer. Information for the change in commitment can be stored to a table accessible to the management system 718.

If there is not sufficient committable capacity on the resources allocated to the customer, the process can attempt to locate at least one resource with capacity to satisfy the new rate request 712. In some embodiments, if a single resource instance is available that is able to provide the desired capacity, the customer allocation can be transferred to that single resource instance instead of being spread across multiple instances. In other embodiments, additional capacity can be provided by adding the additional capacity of another available resource instance. In some embodiments, the system can attempt to consolidate the allocation for a customer where possible, to minimize or at least reduce the number of instances allocated to a single customer. Various other approaches can be used as well within the scope of the various embodiments.

When at least one additional resource instance is located that is able to provide the additional commitment, the process can cause the resource(s) to allocate the additional commitment 714. Mapping information for the additional resource(s) is generated in order to properly direct requests for the customer 716. Information for the change in commitment can be stored to a table or repository accessible to the management system 718. After the commitment is applied and any necessary configuration or provisioning actions performed, the customer is able to directly access the resource for which the guarantee was applied, and subsequent requests can be processed using the increased commitment 720. As mentioned, the user can provided with a DNS address and port number, for example, such that if the action resulted in movement of data or another similar action, the customer or an application can continue to use the same DNS address, which will be directed to the appropriate location.

In some embodiments, the customer might not be allocated to a single resource instance. For example, there might not be a single instance with sufficient capacity to fill the entire commitment. In other cases, the system might be configured to add the additional capacity using a single resource, if possible, while leaving the existing customer allocation on the current resources, thereby minimizing volume changes, etc. In other embodiments, the system might prefer to fill the capacity of existing resource instances before allocating additional resources.

Figure 8:
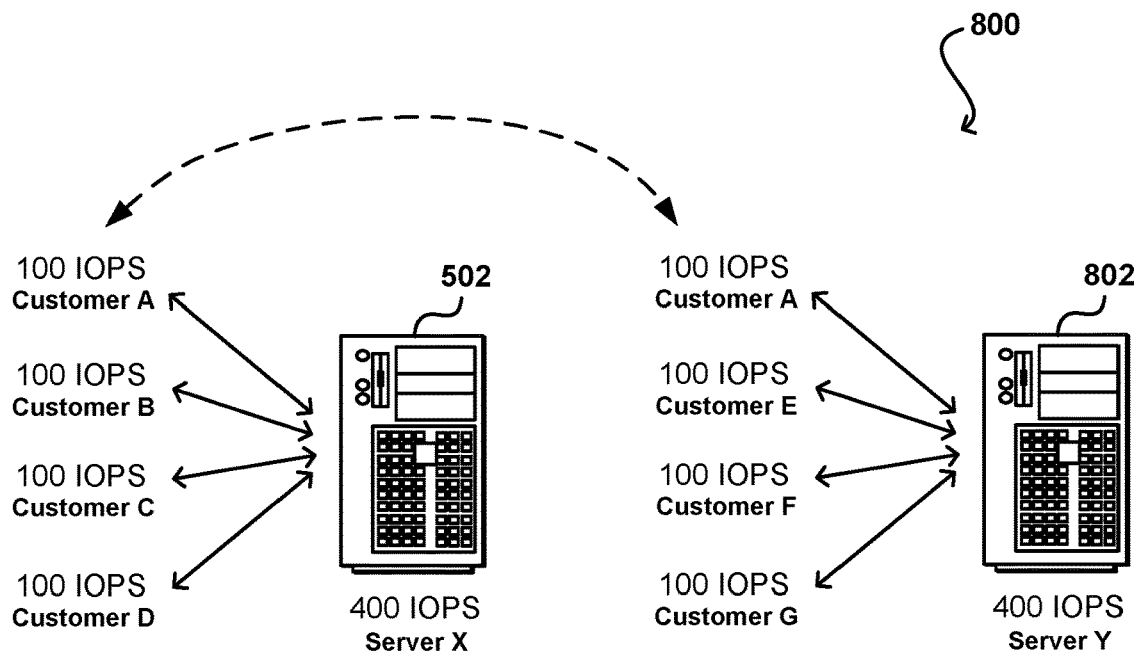
FIG. 8 illustrates an example allocation for an increased customer commitment using multiple resource instances that can be used in accordance with various embodiments.

FIG. 8 illustrates an example 800 wherein the full commitment is not provided by a single resource instance, for any of the above or other appropriate reasons. Again, using the initial example allocation of FIG. 5 as a starting point, in this example the original 100 IOPS for Customer A are still provided by Server X 502. For the additional 100 IOPS, however, the additional requests are allocated to a second server, Server Y 802. In this example, the second server instance handles requests for other customers, but has sufficient available and committable capacity to handle the additional allocation for Customer A. As discussed above, in some embodiments the second server instance could be selected by analyzing data stored in a data store of the control plane to locate an appropriate server to provide the additional committed rate. In other embodiments, servers might be contacted individually until a server is found that can at least accept the additional resource commitment for the customer.

Figure 9:
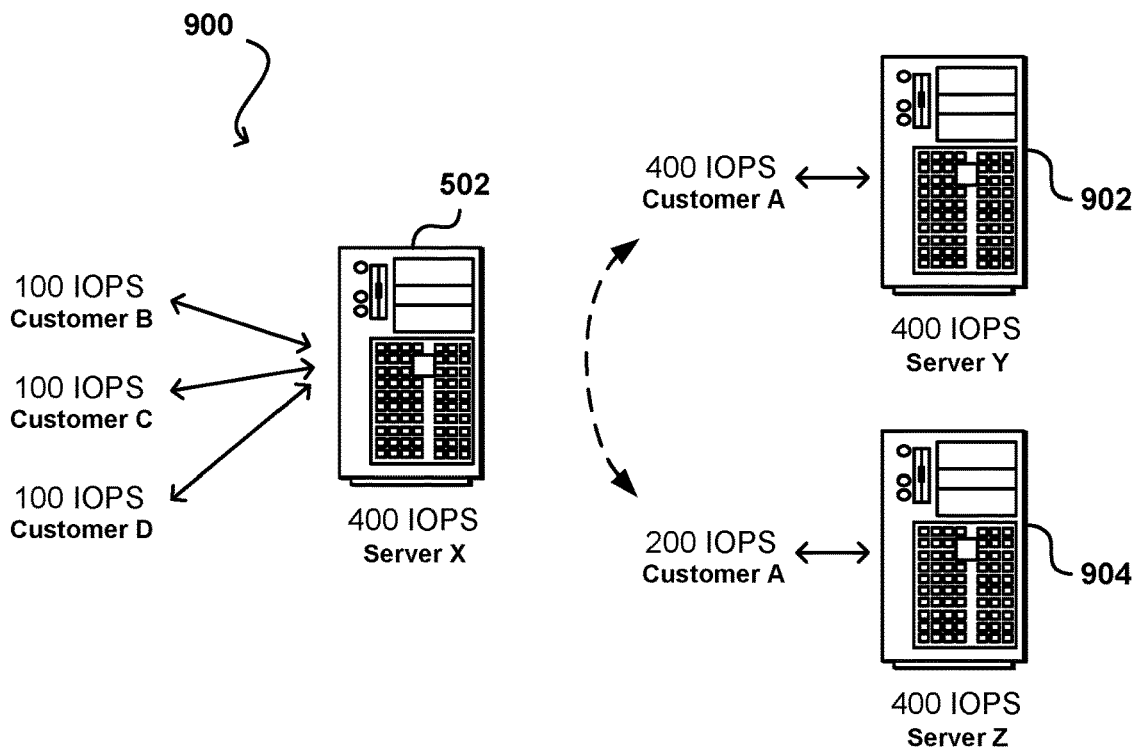
FIG. 9 illustrates an example allocation for an increased customer commitment including migrating data volumes and splitting across multiple resource instances that can be used in accordance with various embodiments.

In some cases, the requested commitment increase cannot be provided by a single resource instance. For example, continuing with the initial starting point of FIG. 5, each server might only be able to commit 400 IOPS. If Customer A wants to increase from 100 IOPS to 600 IOPS, the committed rate will be unable to be provided by a single resource. Thus, at least two additional resource instances would be needed if the original 100 IOPS are to continue to be provided by the first server instance 502. In some embodiments, however, it is desirable to partition or allocate a customer across as few resources as possible, for reasons such as to reduce management complexity and mapping, etc. FIG. 9 illustrates an example allocation 900 wherein the requests for Customer A are removed from Server X 502, the data volume is migrated and split, and the full committed rate is assigned across two resource instances. Here, 400 IOPS are assigned to Server Y 902, with 200 IOPS assigned to a third resource instance, Server Z 904, although other relative allocations could be used as well as should be apparent. By moving the initial requests from the first resource instance 502, the system is able to provide the requested rate commitment using two resource instances instead of three.

As should be apparent, the rate commitment for a given user also can decrease for any of a number of similar reasons. Thus, at least some of the approaches used above to increase commitments can be used substantially in reverse to decrease rate commitments. For example, in FIG. 6 where the user has 200 IOPS split evenly over two resource instances, if the user rate decreases to 100 IOPS then the system could select either instance to retain the 100 IOPS commitment and allow the other to release the commitment. If the rate falls to a level greater than 100 IOPS available on one of the servers, such as a rate of 150 IOPS, the system could leave 100 IOPS on one server and either leave the other 50 IOPS on the current second server, or move those IOPS to a third server with about 50 IOPS on that server, in order to more fully utilize the third server and increase the available capacity on the second server.

In the situation of FIG. 9, the user moved from 100 IOPS on Server X to 400 IOPS on Server Y and 200 IOPS on server Z. If the user moved back to 200 IOPS or 400 IOPS, the system could simply utilize the server that already has that amount allocated to the customer, and release the commitment on the other server. If the user went down to 100 IOPS, the system could reduce the allocation on either Server Y or Z to 100 IOPS, or could move the customer back to Server X, if Server X still has 100 IOPS available, in order to maximize the usage of Server X and maximize the available capacity on Servers Y and Z. In other cases, the system might decide to move the customer to yet another server (not shown) that has a capacity that most closely matches the desired level of IOPS.

Figure 10:
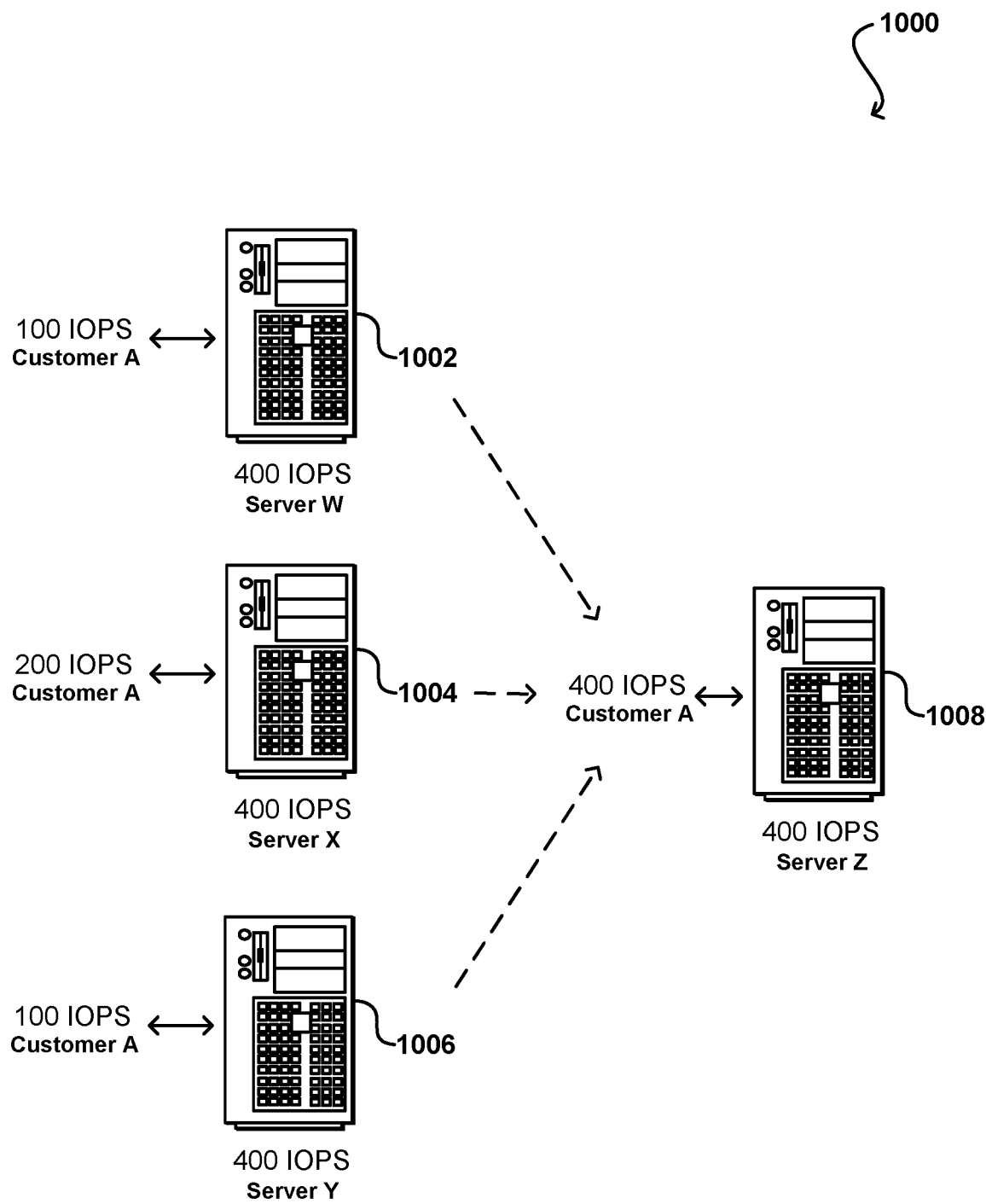
FIG. 10 illustrates an example allocation combining data volumes for a customer in accordance with one embodiment.

In addition to moving, consolidating, or otherwise managing existing resources when adjusting capacity, systems and methods in accordance with various embodiments can also monitor changes in available resources and update resource allocation in response to these changes. For example, FIG. 10 illustrates an example allocation 1000 wherein a customer has a committed rate of 400 IOPS. The committed rate is provided using three different servers 1002, 1004, 1006. In some embodiments, the system can detect when a resource instance becomes available, such as Server Z 1008, which is shown to have a committable capacity of 400 IOPS. Instead of allocating new customer requests to the newly available resource instance, the system in certain embodiments can analyze existing allocations to attempt to consolidate existing customers onto fewer devices and/or instances. In this example, it is determined that server Z 808 has 400 available IOPS, and that Customer A has a committed rate of 400 IOPS spread across three servers. In order to consolidate as much as possible, the system could decide to utilize Server Z to provide all 400 IOPS for customer A. Such an approach can help to lower the complexity of managing and mapping various resources instances, etc., as discussed above.

The decision to consolidate a customer onto fewer devices can be triggered by any of a number of events. In some embodiments, the control plane can communicate with each resource instance periodically in order to determine when a change in available capacity, such that consolidation might be possible. In some embodiments, when there is a reduction in commitments for a resource instance, such as when a customer lowers a committed rate or no longer utilizes the resource, a task can be established in the job queue of the control environment to check the commitments in the Admin data store, or other location, to determine if any consolidation is possible. A similar approach could be utilized whenever a new resource instance is provisioned in the data environment, such that a new record would be stored in the control environment, for example. Various other approaches can be used as well, such as to periodically analyze the commitment information stored in the control environment to determine possible approaches to consolidation. In cases where a user only requires a temporary increase or decrease in commitments, however, the system might not decide to consolidate in order to minimize the copying of data, mapping updates, etc. Thus, certain criteria (e.g., commitment usage, length of time at the current commitment level, etc.) can be utilized in various embodiments to determine whether to consolidate the resources for any given user.

As discussed, differing commitment levels can be allocated and/or data volumes migrated for any of a number of reasons within the scope of the various embodiments. For example, a customer might explicitly request a change in resource commitment, such as by sending a Web services request to an appropriate API of a management system. A customer might also contact an administrator or other authorized user, who can submit such a request on behalf of the customer.

In various embodiments, the adjustments can be made due at least in part to detected changes in any of a number of different aspects of the resources in the data plane, as well as the usage of those resources. For example, a particular resource instance might be in an overload situation for longer periods of time than are acceptable, such as might be based upon specified criteria or thresholds. In such a situation, the system can decide to move at least one customer to a different instance, in order to reduce the average load on the often overloaded resource instance. In other embodiments, a customer might frequently exceed the committed rate, such that the system might decide to migrate the data volume for that customer to a resource with greater capacity.

In some embodiments, the system might automatically adjust rates or other resource commitments for various users. For example, a customer might be willing to pay for different levels of commitments at different times, but might not want to pay for the highest commitment rate when the customer is not using much of the committed capacity. In one such embodiment, a customer can select two or more levels, tiers, or other values that can be used for commitment rates at various times. For example, a customer might be willing to pay for a committed rate of up to 500 IOPS if the committed rate is being used at least 75% of capacity. If the usage is less than 75% for a period of time, the committed rate might drop to a lower value, such as a committed rate of 350 IOPS. The rate might stay at 350 IOPS until either the usage drops below 75% of the 350 IOPS for a period of time, at which time the rate might adjust to 200 IOPS, or the usage increases to at least 110% of the committed rate for a period of time, at which time the committed rate might adjust back to 500 IOPS. The periods of time necessary to increase or decrease the committed rate might be different, as the customer might favor either having committed rates for requests as much as possible or only paying for higher committed rates when absolutely necessary, for example. Further, there can be any appropriate thresholds, number of tiers, possible rates, or other such values within the scope of the various embodiments.

In some embodiments, an increase in rate commitment can be tied to the processing performance of the I/O requests for a customer. For example, a customer with a specified commitment rate might not want to increase the rate as long as the customer's I/O requests are being processed in a timely fashion. As discussed, excessive requests can be processed in a timely fashion as long as there is sufficient uncommitted capacity on a resource, or there is unused committed capacity. If the resource enters an overload situation, for example, the excess requests may not be processed in a timely fashion, and could be slowed down in order to attempt to recover from the excessive load. The customer can authorize the system in such a situation to automatically increase the committed rate, on the same resource or a different resource, in order to ensure that subsequent requests from the customer are processed in a timely fashion. Similarly, the usage of various resources can be monitored such that if capacity exists, the customer can automatically drop down to a lower committed rate as long as any excess requests will likely be processed without significant delay.

By providing commitments at varying granularities, a provider can provide a number of different pricing schemes. For example, a user might pay a certain amount for each committed IOPS, such as $0.30 per guaranteed IOPS, whether or not the user actually uses that amount. Thus, if a user purchases a commitment of 100 IOPS for a month, the user would pay $30 regardless of the actual usage, as the user is paying for the commitment. Various other pricing approaches can be used as well, such as various tiered pricing schemes. In other embodiments, a user might pay a premium for a level of committed IOPS, but that amount might be offset by the amount of unused commitment that was utilized by other users. For example, a user might pay $30 for 100 IOPS for a month, but if on average other users utilized 25 of those committed IOPS allocated to that customer, the customer might see a reduction such as $0.05 per IOPS, for a total monthly fee of $25. If the rate is adjusted during a specific period of time, the charge to the customer can reflect the different rates apportioned over that period.

As discussed, a customer might go over their committed amount as well. Various pricing approaches can be used for these extra IOPS within the scope of various embodiments. In one embodiment, the customer is charged the same for the excess IOPS as any customer having un-committed IOPS (e.g., $0.10 per IOPS), and the customer requests are treated the same as these requests. In other embodiments, the customer can select to pay extra per IOPS to be handled with the other requests, but given priority over standard requests. In some embodiments, a customer can pay a premium to have their excess requests processed within the available committed resources of another customer, such that the requests will be handled as a committed request as long as at least one other customer on the resource is below their level of commitment. While customers may want the ability to spike request rates if needed, in certain embodiments users might be capped at a certain level, whether to limit customer costs, ensure certain levels of quality of service, or for other such reasons. The ability to exceed guaranteed levels can also be beneficial to customers who are scaling a system or application, as the customer can determine areas of need without suffering significantly in quality of service.

Figure 11:
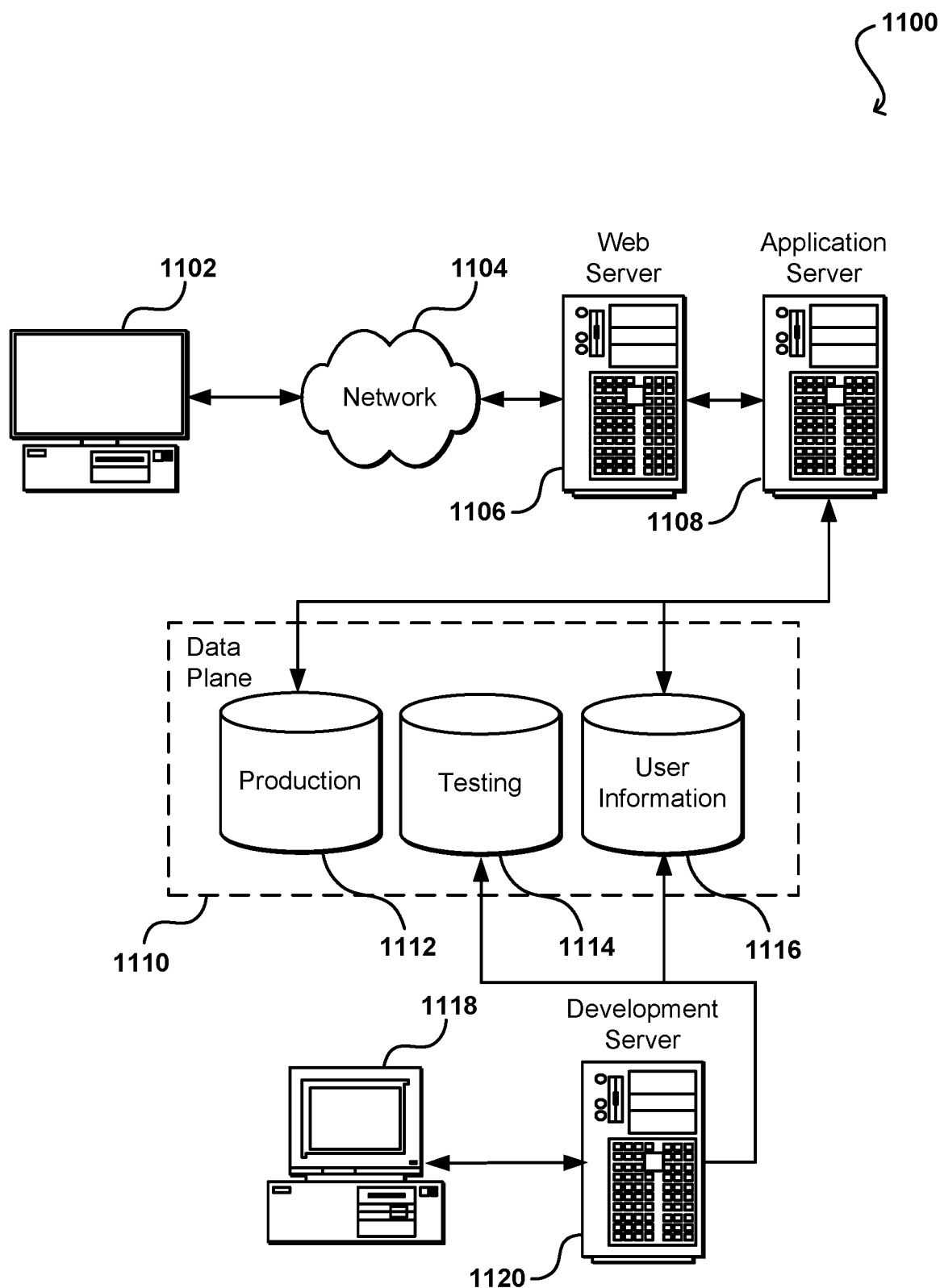
FIG. 11 illustrates an example environment that can take advantage of functionality of the various embodiments.

FIG. 11 illustrates an example of an environment 1100 that can utilize and/or take advantage of aspects in accordance with various embodiments. As will be appreciated, although a Web-based environment is used for purposes of explanation, different environments may be used, as appropriate, to implement various embodiments. The environment 1100 shown includes both a testing or development portion (or side) and a production portion. The production portion includes an electronic client device 1102, which can include any appropriate device operable to send and receive requests, messages, or information over an appropriate network 1104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 1118 allowing a user such as a developer, data administrator, or tester to access the system. The user device 1118 can be any appropriate device or machine, such as is described above with respect to the client device 1102. The environment also includes a development server 1120, which functions similar to the application server 1108 but typically runs code during development and testing before the code is deployed and executed on the production side and is accessible to outside users, for example. In some embodiments, an application server can function as a development server, and separate production and testing storage may not be used.

The data store 1110 can include several separate data tables, databases, or other data storage mechanisms and media for storing data relating to a particular aspect. For example, the data store illustrated includes mechanisms for storing production data 1112 and user information 1116, which can be used to serve content for the production side. The data store also is shown to include a mechanism for storing testing data 1114, which can be used with the user information for the testing side. It should be understood that there can be many other aspects that may need to be stored in the data store, such as for page image information and access right information, which can be stored in any of the above listed mechanisms as appropriate or in additional mechanisms in the data store 1110. The data store 1110 is operable, through logic associated therewith, to receive instructions from the application server 1108 or development server 1120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature, and not limiting to the scope of the disclosure.

An environment such as that illustrated in FIG. 11 can be useful for a provider such as an electronic marketplace, wherein multiple hosts might be used to perform tasks such as serving content, authenticating users, performing payment transactions, or performing any of a number of other such tasks. Some of these hosts may be configured to offer the same functionality, while other servers might be configured to perform at least some different functions. The electronic environment in such cases might include additional components and/or other arrangements, such as those illustrated in the configuration 200 of FIG. 2, discussed in detail below.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    receiving a provision request to provision a data volume of a shared resource, the data volume having a performance tier, the performance tier being a first performance tier specifying a first processing rate of input/output (I/O) operations per second (IOPS);
    in response to the provision request, provisioning the data volume of the shared resource, and attaching the data volume to a virtual machine hosted by a host computing system;
    receiving a request to change the performance tier of the data volume to a second performance tier specifying a second processing rate of IOPS that is different from the first processing rate of IOPS;
    causing the shared resource to change the performance tier of the data volume to the second performance tier; and
    performing one or more tasks using data from the data volume at the second processing rate of IOPS according to the second performance tier.

2. The computer-implemented method of claim 1, further comprising:
    receiving another request to change the performance tier to a third performance tier specifying a third processing rate of IOPS that is different from the first processing rate of IOPS and the second processing rate of IOPS; and
    causing the shared resource to change the performance tier of the data volume to the third performance tier;
    performing one or more additional tasks using the data at the third processing rate of IOPS according to the third performance tier.

3. The computer-implemented method of claim 1, wherein the first performance tier specifies a first amount of storage space, and wherein the second performance tier specifies a second amount of storage space that is different from the first amount of storage space.

4. The computer-implemented method of claim 1, wherein a source of the request to change the performance tier of the data volume is a client or a management component, wherein the management component monitors a usage of the data volume.

5. The computer-implemented method of claim 1, further comprising:
receiving a detach request to detach the data volume from the virtual machine.

6. The computer-implemented method of claim 1, further comprising:
determining that performing the one or more tasks would exceed the second processing rate of IOPS; and
allocating an additional commitment of IOPS for a period of time to perform the one or more tasks.

7. The computer-implemented method of claim 1, further comprising:
storing one or more copies of the data volume at the shared resource.

8. A system, comprising:
one or more processors; and
a memory storing instructions that, when executed on or across the one or more processors, cause the one or more processors to:
in response to a provision request, provision a data volume of a shared resource and attach the data volume to a virtual machine hosted by a host computing system, the shared volume having a performance tier, the performance tier being a first performance tier specifying a first processing rate of input/output (I/O) operations per second (IOPS);
in response a change request, change the performance tier of the data volume to a second performance tier specifying a second processing rate of IOPS that is different from the first processing rate of IOPS; and
perform one or more tasks using data from the data volume at the second processing rate of IOPS according to the second performance tier.

9. The system of claim 8, wherein the memory further comprises instructions that, when executed on or across the one or more processors, cause the one or more processors to:
in response to another change request, change the performance tier to a third performance tier specifying a third processing rate of IOPS that is different from the first processing rate of IOPS and the second processing rate of IOPS; and
cause the shared resource to change the performance tier of the data volume to the third performance tier;
perform one or more additional tasks using the data at the third processing rate of IOPS according to the third performance tier.

10. The system of claim 8, wherein the first performance tier specifies a first amount of storage space, and wherein the second performance tier specifies a second amount of storage space that is different from the first amount of storage space.

11. The system of claim 8, wherein the change request is received from one of a client or a management component, wherein the management component monitors a usage of the data volume.

12. The system of claim 8, wherein the memory further comprises instructions that, when executed on or across the one or more processors, cause the one or more processors to:
in response to a detach request, detach the data volume from the virtual machine.

13. The system of claim 8, wherein the memory further comprises instructions that, when executed on or across the one or more processors, cause the one or more processors to:
determine that performing the one or more tasks would exceed the second processing rate of IOPS; and
allocate an additional commitment of IOPS for a period of time to perform the one or more tasks.

14. The system of claim 8, wherein the memory further comprises instructions that, when executed on or across the one or more processors, cause the one or more processors to:
store one or more copies of the data volume at the shared resource.

15. One or more computer-readable storage media storing instructions that, when executed on or across one or more processors, cause the one or more processors to:
in response to a provision request, provision a data volume of a shared resource and attach the data volume to a virtual machine hosted by a host computing system, the shared volume having a performance tier, the performance tier being a first performance tier specifying a first processing rate of input/output (I/O) operations per second (IOPS);
in response a change request, change the performance tier of the data volume to a second performance tier specifying a second processing rate of IOPS that is different from the first processing rate of IOPS; and
perform one or more tasks using data from the data volume at the second processing rate of IOPS according to the second performance tier.

16. The one or more computer-readable storage media of claim 15, wherein the memory further comprises instructions that, when executed on or across the one or more processors, cause the one or more processors to:
in response to another change request, change the performance tier to a third performance tier specifying a third processing rate of IOPS that is different from the first processing rate of IOPS and the second processing rate of IOPS; and
cause the shared resource to change the performance tier of the data volume to the third performance tier;
perform one or more additional tasks using the data at the third processing rate of IOPS according to the third performance tier.

17. The one or more computer-readable storage media of claim 15, wherein the first performance tier specifies a first amount of storage space, and wherein the second performance tier specifies a second amount of storage space that is different from the first amount of storage space.

18. The one or more computer-readable storage media of claim 15, wherein the memory further comprises instructions that, when executed on or across the one or more processors, cause the one or more processors to:
receive the change request from one of a client or a management component monitoring a usage of the data volume.

19. The one or more computer-readable storage media of claim 15, wherein the memory further comprises instructions that, when executed on or across the one or more processors, cause the one or more processors to:
in response to a detach request, detach the data volume from the virtual machine.

20. The one or more computer-readable storage media of claim 15, wherein the memory further comprises instructions that, when executed on or across the one or more processors, cause the one or more processors to:
- determine that performing the one or more tasks would exceed the second processing rate of IOPS; and
- allocate an additional commitment of IOPS for a period of time to perform the one or more tasks.

* * * * *